United States Patent
Gomyo et al.

(10) Patent No.: US 7,059,771 B2
(45) Date of Patent: Jun. 13, 2006

(54) MOTORS WITH OIL DYNAMIC PRESSURE BEARING, OIL DYNAMIC PRESSURE BEARING DEVICES AND METHOD FOR MANUFACTURING THE SAME

(75) Inventors: Masato Gomyo, Nagano (JP); Noboru Ashibe, Nagano (JP); Shingo Suginobu, Shimosuwa-machi (JP)

(73) Assignee: Nidec Sankyo Corporation, Nagano (JP)

( * ) Notice: Subject to any disclaimer, the term of this patent is extended or adjusted under 35 U.S.C. 154(b) by 68 days.

(21) Appl. No.: 10/439,274

(22) Filed: May 15, 2003

(65) Prior Publication Data

US 2004/0013331 A1 Jan. 22, 2004

(30) Foreign Application Priority Data

May 17, 2002 (JP) ............................. 2002-143582
May 17, 2002 (JP) ............................. 2002-143597

(51) Int. Cl.
*F16C 17/10* (2006.01)
(52) U.S. Cl. ...................................... 384/100; 384/107
(58) Field of Classification Search ............... 384/100, 384/107–124

See application file for complete search history.

(56) References Cited

FOREIGN PATENT DOCUMENTS

| JP | 2001-065552 | 3/2001 |
|----|-------------|--------|
| JP | 2001-349402 | 12/2001 |

*Primary Examiner*—Lenard A. Footland
(74) *Attorney, Agent, or Firm*—Hogan & Hartson, LLP

(57) ABSTRACT

A motor with fluid dynamic pressure bearing is disclosed. The motor includes a dynamic pressure bearing member having a concave section that is concave in an axial direction, a rotary shaft that is rotatively supported by the dynamic pressure bearing, and a rotary member that is joined to the rotary shaft in one piece along a joint section between the rotary member and the rotary shaft, and rotatively driven by electromagnetic drive force, an expanded diameter section that is provided on the dynamic pressure bearing member. A fallout preventing member is provided on the rotary member, which overlaps the expanded diameter section of the dynamic pressure bearing member in the axial direction to prevent the rotary shaft from falling out of the dynamic pressure bearing member. The concave section of the rotary member opposes in the axial direction the expanded diameter section of the dynamic pressure bearing member, wherein the expanded diameter section is placed inside the concave section, and the joining section between the rotary member and the rotary shaft overlaps the expanded diameter section in the radial direction.

25 Claims, 15 Drawing Sheets

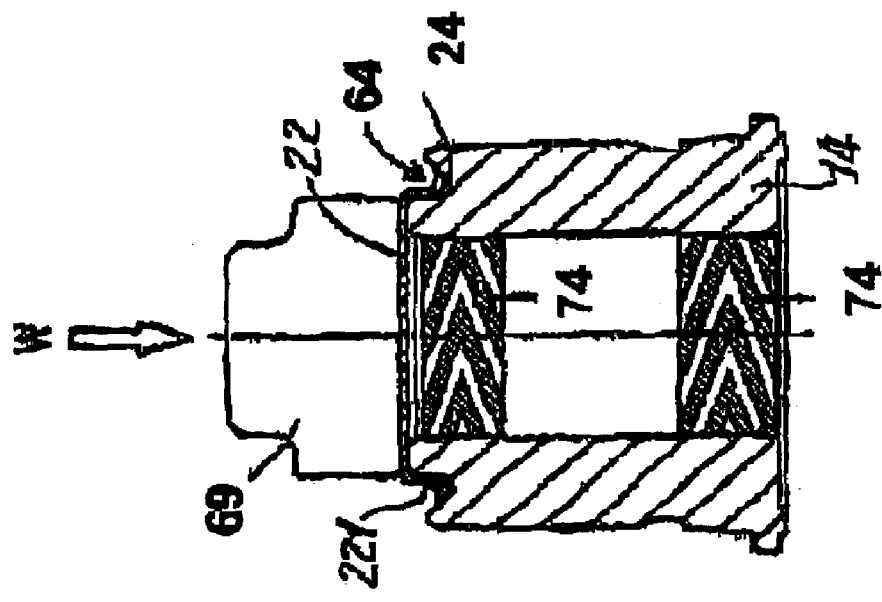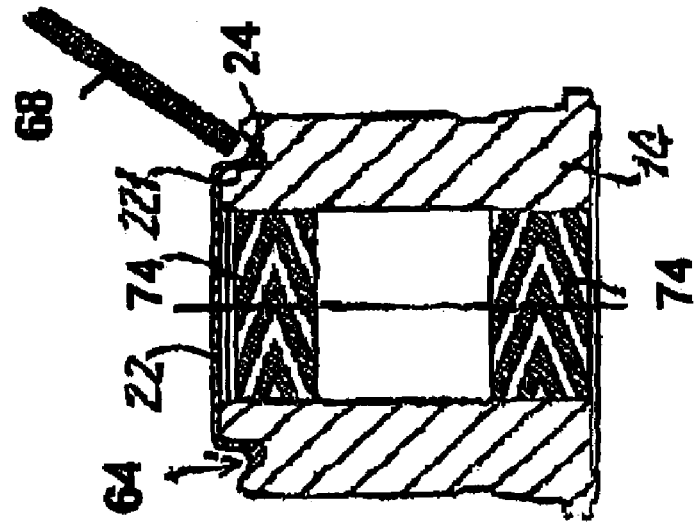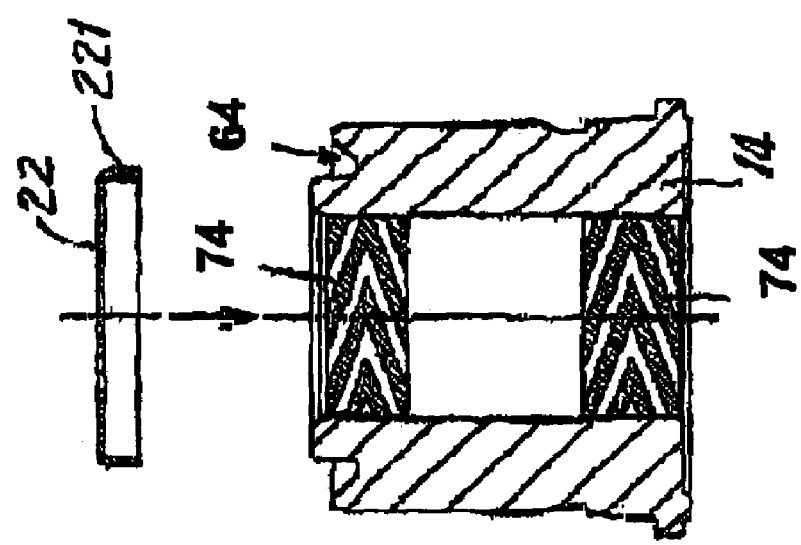

MOTORS WITH OIL DYNAMIC PRESSURE BEARING, OIL DYNAMIC PRESSURE BEARING DEVICES AND METHOD FOR MANUFACTURING THE SAME

BACKGROUND OF THE INVENTION

1. Field of the Invention

The present invention relates to motors with oil dynamic pressure bearings, which are equipped with a rotary shaft and a dynamic pressure bearing member in which the rotary shaft rotates relatively to the dynamic pressure bearing member in a non-contact manner, oil dynamic pressure bearing devices and method for manufacturing the same. The present invention also relates to motors with oil dynamic pressure bearing and oil dynamic pressure bearing devices, which can be used for disk drive motors for magnetic disks, optical disks or the like, as well as drive motors of a variety of apparatuses for which high rotational precision is demanded.

2. Related Background Art

Motors with oil dynamic pressure bearing (hereafter referred to as "oil dynamic pressure bearing motors") are used as drive motors for various apparatuses for which high rotational precision is demanded. For example, in hard disk drive apparatuses, the recording density of hard disks is increasing rapidly, and the rotational speed and rotational precision of disks are concomitantly on the rise. Using oil dynamic pressure bearing motors with oil dynamic pressure bearing apparatuses is an appropriate approach to meet demands for higher rotational speed and higher rotational precision of disks.

Lengthening the joining length between members that are mutually joined is effective for achieving higher rotational speed and higher rotational precision of oil dynamic pressure bearing motors, and ensuring longer bearing range in the axial direction of radial dynamic pressure bearings is effective for obtaining higher rigidity for the dynamic pressure bearings. On one hand, it is desirable to structure dynamic pressure bearing motors to seal sufficient amount of lubricating oil to maintain a long life for the dynamic pressure bearing motors, while on the other hand it is desirable to provide sealing apparatuses, which prevent the lubricating oil from leaking, with ample space.

FIGS. 11 and 12 indicate examples of oil dynamic pressure bearing motors that may satisfy demands described above. The oil dynamic pressure bearing motors shown in FIGS. 11 and 12 will be described below. In FIGS. 11 and 12, the emphasis is on the dynamic pressure bearing part, and the motor part is omitted.

In FIG. 11, a rotary shaft 16 is rotatively supported by a dynamic pressure bearing member 14. The dynamic pressure bearing member 14 is virtually cylindrical, and the rotary shaft 16 is fitted into its center hole with a miniscule gap between the two members. On the part of the rotary shaft 16 that protrudes above the top end of the dynamic pressure bearing member 14 is joined a rotary member 20 through press fit. In this example, the rotary member 20 is a hub that rotates with a disk mounted on it. To prevent lubricating oil 18 that generates dynamic pressure force from leaking out, joining parts between the rotary shaft 16 and the rotary member 20 are welded, or sealed by a sealing material, along the entire circumference. The dynamic pressure bearing member 14 comprises a cylindrical section, which forms radial dynamic pressure bearings 26, 26, and an expanded diameter section 28, which forms a thrust dynamic pressure bearing 34 on the outer circumference side of the cylindrical section. The expanded diameter section 28 is formed as a flange on one end section (in the figure, on the left end section) of the cylindrical section. On the inner circumference surface of the cylindrical section of the dynamic pressure bearing member 14, radial dynamic pressure generating grooves are formed. Thrust dynamic pressure generating grooves are formed on an end surface of the expanded diameter section 28. The radial dynamic pressure generating grooves are formed along the entire circumference at two locations separated from each other on the inner circumference surface of the cylindrical section of the dynamic pressure bearing member 14. The thrust dynamic pressure generating grooves are also formed along the entire circumference on the end surface of the expanded diameter section 28.

Into the cylindrical section of the dynamic pressure bearing member 14 is inserted from above the rotary shaft 16 that is press fit in a unitary fashion with the rotary member 20. From the bottom on the outer circumference of the dynamic pressure bearing member 14 a ring-shaped fallout preventing member 30 is inserted and joined to an inner circumference surface 54 of the rotary member 20 The rotary member 20 has a flat step section 56 that is continuous with the inner circumference surface 54, and the fallout preventing member 30 is joined also to the step section 56. Furthermore, to prevent the lubricating oil 18, to be described later, from leaking, a joining section between the fallout preventing member 30 and the rotary member 20 is Sealed with an adhesive. At the bottom end of the dynamic pressure bearing member 14 is formed a concentric circumferential groove 100 along the entire circumference, as described later (see FIG. 13), and a flat-shaped cover 22 is capped on the circumferential groove 100, such that the bottom end opening of the dynamic pressure bearing member 14 is closed off by the cover 22. The cover 22 is sealed with an adhesive 24 in the circumferential groove 100 at the bottom end of the dynamic pressure bearing member 14.

A gap is formed between the inner circumference surface of the fallout preventing member 30 and the opposing outer circumference surface of the dynamic pressure bearing member 14, between the top surface of the fallout preventing member 30 and the opposing bottom surface of the expanded diameter section 28 of the dynamic pressure bearing member 14, between the outer circumference surface of the expanded diameter section 28 and the opposing circumferential wall surface of the rotary member 20, between a ceiling surface of the rotary member 20 and the opposing top surface of the expanded diameter section 28, between the inner circumference surface of the dynamic pressure bearing member 14 and the opposing outer circumference surface of the rotary shaft 16, and between the cover 22 and the bottom end surface of the rotary shaft 16.

These gaps are mutually communicated with each other in the sequence described above and are filled with the lubricating oil 18. The gap between the inner circumference surface of the fallout preventing member 30 and the opposing outer circumference surface of the dynamic pressure bearing member 14 is open towards the bottom. Further, the outer circumference surface of the dynamic pressure bearing member 14 that opposes the inner circumference surface of the fallout preventing member 30 is a tapered section whose outer diameter grows smaller towards the bottom; as a result, the gap between the inner circumference surface of the fallout preventing member 30 and the outer circumference surface of the dynamic pressure bearing member 14 forms a capillary sealing section 32 whose dimension gradually enlarges towards the bottom. The liquid level of the lubricating oil 18 is in the capillary sealing section 32.

The lubricating oil 18 is poured into the gaps through the capillary sealing section 32. The thrust dynamic pressure bearing 34 is formed between the end surface of the rotary member 20 on the side of the expanded diameter section 28 and the opposing end surface of the expanded diameter section 28, and the radial dynamic pressure bearings 26, 26 are formed at two locations separated from each other between the inner circumference surface of the dynamic pressure bearing member 14 and the outer circumference surface of the rotary shaft 16. The lubricating oil 18 is present in these dynamic pressure bearings.

The outer circumference of approximately half of the bottom of the dynamic pressure bearing member 14 is fitted and fixed to the inner circumference side of a cylindrical section formed in the center section of a base plate 10, which is indicated by a dotted line. The cylindrical section of the base plate 10 extends into the rotary member 20 to reach near the fallout preventing member 30. In FIG. 11, L represents the joining length in the axial direction between the base plate 10 and the dynamic pressure bearing member 14.

At the bottom end of the rotary member 20 is formed a cylindrical circumferential wall 44, and a drive magnet, not shown, is mounted on the outer circumference surface of the circumferential wall 44. The drive magnet, the rotary member 20 and the rotary shaft 16 make up a rotor of the motor. In the meantime, on the base plate 10 is fixed a stator of the motor consisting of a core and drive coils wound around a plurality of salient poles formed in a unitary structure with the core, all not shown. The salient poles of the stator oppose the outer circumference surface of the drive magnet across an appropriate gap, and the rotor is rotatively driven by switching the energization provided to the drive coils.

The example shown in FIG. 12 has a structure virtually identical to the example in FIG. 11, but the thickness of a fallout preventing member 30, the length of a capillary sealing section 32, and a length L of a joining section between a dynamic pressure bearing member 14 and a base plate 10 are different. In the example shown in FIG. 11, the joining length between the rotary shaft 16 and the rotary member 20, the thickness of the fallout preventing member 30, and the length of the capillary sealing section 32 are all amply provided for, but the length L of the joining section between the dynamic pressure bearing member 14 and the base plate 10 is not sufficient. The example in FIG. 12 amply provides for a joining length between a rotary shaft 16 and a rotary member 20 and the joining length L of the joining section between the dynamic pressure bearing member 14 and the base plate 10, but the thickness of the fallout preventing member 30 and the length of the capillary sealing section 32 are insufficient; consequently, the amount of lubricating oil retained is small and there is a risk of shortening the life of the motor as a result of the evaporation of the lubricating oil. Furthermore, the joining strength between the base plate 10 and the dynamic pressure bearing member 14 is also insufficient.

In the meantime, an oil dynamic pressure bearing apparatus used in the oil dynamic pressure bearing motor is provided with a rotary shaft and a dynamic pressure bearing member, and lubricating oil is present in a minuscule gap between the rotary shaft and the dynamic pressure bearing member. By having the rotary shaft rotate relatively to the dynamic pressure bearing member, dynamic pressure force is generated by dynamic pressure generating grooves formed at least on one of the rotary shaft and the dynamic pressure bearing member, and the dynamic pressure force causes the rotary shaft to rotate without any contact with the dynamic pressure bearing member.

An example of the oil dynamic pressure bearing apparatus used in the oil dynamic pressure bearing motor in FIG. 11 is shown in FIG. 13. In FIG. 13, radial dynamic pressure generating grooves 74, 74, which compose parts of a radial dynamic pressure bearing, are formed on both end sections in the axial direction of a surface of a rotary shaft insertion hole of the generally cylindrical dynamic pressure bearing member 14. The rotary shaft, not shown, is inserted in the rotary shaft insertion hole of the dynamic pressure bearing member 14 with a minuscule gap between it and the surface of the rotary shaft insertion hole. In FIG. 13, on the top end surface of the dynamic pressure bearing member 14 are formed the circumferential groove 100, except for a circular dyke 102, i.e., a circular wall, on the outer circumference. A cover 22 is placed in the circumferential groove 100. The cover 22 is flat cup-shaped and has a cylindrical circumferential wall 221, as well as a flange section 222 that is continuous with the circumferential wall 221 and protrudes perpendicularly outward from the circumferential wall 221. With the flange section 222 in contact with the bottom surface of the circumferential groove 100, the adhesive 24 is filled into and hardened in the circumferential groove 100; this causes the cover 22 to be fixed to the dynamic pressure bearing member 14, such that one end surface of the dynamic pressure bearing member 14 whose rotary shaft insertion hole is open is closed off by the cover 22.

As indicated in FIG. 11, the dynamic pressure bearing member 14 is vertically inverted from its posture shown in FIG. 13. The inner diameter of the circumferential wall 221 of the cover 22 is the same as the inner diameter of the dynamic pressure bearing member 14, such that when the rotary shaft 16 is inserted into the rotary shaft insertion hole of the dynamic pressure bearing member 14, an end section of the rotary shaft 16 enters into the cover 22. There is a minuscule gap between the inner circumference surface of the circumferential wall 221 of the cover 22 and the outer circumference surface of the rotary shaft 16. Further, due to the fact that a rotary body including the rotary shaft 16 is supported in the thrust direction by the thrust dynamic pressure bearing 34, there is a minuscule gap also between one end surface of the rotary shaft 16 and the opposing inner bottom surface of the cover 22. The lubricating oil 18 is present in these gaps, so that when the rotary shaft 16 rotates relatively to the dynamic pressure bearing member 14, dynamic pressure force is generated by the radial dynamic pressure generating grooves 74, 74 and the rotary shaft 16 is supported without any contact with the dynamic pressure bearing member 14.

Another example of an oil dynamic pressure bearing apparatus is shown in FIG. 14. In FIG. 14, around the periphery of an opening section of a rotary shaft insertion hole on one end surface of a dynamic pressure bearing member 14 is formed a groove-shaped circumferential groove 76 that is depressed in the axial direction and continuous in the circumferential direction. Into the circumferential groove 76 is inserted a cylindrical circumferential wall 221 of a flat cup-shaped cover 22, such that one end surface of the dynamic pressure bearing member 14 whose rotary shaft insertion hole is open is closed off by the cover 22. The outer circumference surface of the circumferential wall 221 of the cover 22 is in contact with a circumferential wall surface on the outer diameter side of the circumferential groove 76; an adhesive is filled and hardened on the contact surfaces, which provides a seal to prevent lubricating oil from leaking.

In recent years, there are increasingly greater demands to make hard disk drive apparatuses and other apparatuses even smaller and thinner, and demands to make oil dynamic pressure bearing motors thinner have grown stronger along with them. For example, super-thin type hard disk drive apparatuses, which may be called card-compatible hard disk drive apparatuses, are close to being realized, and the height of motors used in such hard disk drive apparatuses would have to be limited to approximately 3 mm. When an attempt is made to realize such an oil dynamic pressure bearing motor, whose height dimension is extremely limited, using structures indicated in FIG. 11 or 12, problems described below can occur.

When the rotary member 20 and the rotary shaft 16 are joined, if the perpendicularity precision of both members is poor, the swing of the rotary member 20 during rotation becomes larger. In the case of a disk drive motor, a disk mounting surface swings and causes the disk to undulate as it rotates, such that the disk vibrates, or the flow of air generated by the rotation of the disk becomes disrupted. Any of these can cause the head to fail to levitate above the disk by a predetermined amount and/or tracks to be displaced and error rate during data reproduction to be increased. Further, due to the fact that the back surface of the rotary member 20 is a thrust bearing surface, if the perpendicularity of the rotary shaft 16 with the rotary member 20 is poor, the number of revolutions for levitation, i.e., the number of revolutions required to obtain predetermined levitating force in the thrust direction, increases, such that the amount of time the rotary member 20 is in contact with the dynamic pressure bearing member 14 becomes longer, which causes greater bearing wear and therefore lower reliability of the bearing.

In the meantime, in order to ensure the perpendicularity between the rotary member 20 and the rotary shaft 16, the joining length between the two must be equal to or greater than a predetermined length.

Next, the height, i.e., the length in the axial direction, of the dynamic pressure bearing member 14 will be considered. The outer circumference section of the dynamic pressure bearing member 14 must accommodate the thickness dimension of the expanded diameter section 28, the length that corresponds to the fallout preventing member 30, the length of the capillary sealing section 32, and the joining length between the base plate 10 and the dynamic pressure bearing member 14. The joining length between the base plate 10 and that dynamic pressure bearing member 14 requires a joining strength that would not cause the members to move or separate even if there is impact or vibration applied from the outside. Normally, since the base plate 10 and the dynamic pressure bearing member 14 are joined by an adhesive, sufficient joining area must be ensured.

When demands for thinner motors become more and more vigorous as they have been in recent years, dynamic pressure bearing motors, in which the thrust dynamic pressure bearing 34 is virtually in the same position in the axial direction as the position of an end section of the radial dynamic pressure bearings 26 as in the examples in FIGS. 11 and 12, face circumstances in which they cannot satisfy demands using the structures of examples indicated in FIGS. 11 and 12. In other words, when the joining length between the rotary shaft 16 and the rotary member 20, the thickness of the fallout preventing member 30 and the length of the capillary sealing section 32 are amply provided for as in the example in FIG. 11, the length L of the joining section between the dynamic pressure bearing member 14 and the base plate 10 cannot be sufficiently ensured. When the joining length between the rotary shaft 16 and the rotary member 20 and the length L of the joining section between the dynamic pressure bearing member 14 and the base plate 10 are amply provided for as in the example in FIG. 12, the thickness of the fallout preventing member 30 and the length of the capillary sealing section 32 cannot be sufficiently ensured.

Further, as shown in FIG. 13, the cover 22 that closes off one end surface of the dynamic pressure bearing member 14 is flat cup-shaped and fixed through adhesion to the circumferential groove 100 formed on one end surface of the dynamic pressure bearing member 14, and one part of the rotary shaft 16 is inserted into the cover 22. For this reason, the effective length in the axial direction of the dynamic pressure bearing member 14 is limited by the depth of the circumferential groove 100, which causes the span of the top and bottom radial dynamic pressure bearings to be shorter, which in turn causes the oil dynamic pressure bearing apparatus to tend to have low rigidity. On the other hand, when the span of the top and bottom radial dynamic pressure bearings is lengthened in an effort to ensure rigidity for the oil dynamic pressure bearing apparatus, the dynamic pressure bearing member 14 becomes longer and the oil dynamic pressure bearing motor cannot be made thinner. However, there is an advantage in that the joining length between the dynamic pressure bearing member 14 and the base plate 10 can be sufficiently ensured. In addition, the structure allows the adhesive 24 to easily enter the bearing, i.e., into the rotary shaft insertion hole.

In the meantime, as shown in FIG. 14, since the cover 22 closes off an opening on virtually one and surface of the dynamic pressure bearing member 14, the effective length of the dynamic pressure bearing member 14 becomes longer; this makes it possible to provide for a long span of the top and bottom radial dynamic pressure bearings, which is advantageous for obtaining an oil dynamic pressure bearing apparatus with high rigidity. In addition, there is another advantage in that this can ensure sufficient joining length between the dynamic pressure bearing 14 and the base plate 10. However, due to the fact that the outer circumference surface of the cover 22 and the outer circumferential wall surface of the ring-shaped circumferential groove 76 formed on one end surface of the dynamic pressure bearing member 14 are joining surfaces, sufficient adhesive cannot be coated on or filled in between the dynamic pressure bearing member 14 and the cover 22; this results in insufficient reliability for a sealing means of the opening. Furthermore, a large space formed between the circumferential wall 221 of the cover 22 and the wall surface on the inner circumference side of the circumferential groove 76 must be filled with dynamic pressure generating lubricating oil, which requires a long time and leads to lower productivity. Moreover, parts that are filled with a large amount of the lubricating oil tend to have air bubbles in the lubricating oil, which can cause the lubricating oil to be more prone to leaking.

In addition to the examples described, the sealing structure of one end surface of the dynamic pressure bearing member 14 can be as shown in FIGS. 15 through 17.

In the example in FIG. 15, a circumferential groove 88 is formed on one end surface of a dynamic pressure bearing member 14, a flat plate-shaped cover 86 is mounted on the circumferential groove 88, and a circumferential edge of the cover 86 and a circumferential edge of the circumferential groove 88 are welded together with a laser welder 90. In this example, the thickness of the cover 86 must be thick in order to achieve high reliability for the sealing means of an opening, but the thicker cover 86 causes the span in which to position a radial dynamic pressure bearing 14 to be shorter.

In the example in FIG. 16, a shallow concavely depressed section is formed on one end surface of a dynamic pressure bearing member 14, a groove-shaped circumferential groove 94 that is depressed in the axial direction and continuous in the circumferential direction is formed on the outer circumference side of the concavely depressed section, a thin flat plate-shaped cover 92 is placed over the shallow concavely depressed section, an adhesive 24 is filled in the circumferential groove 94, and an outer circumference edge section of the cover 92 is adhered to the dynamic pressure bearing member 14 to seal an opening. In this examples, the outer circumference edge section of the cover 92 is not folded and the flat plate-shaped cover 92 is joined to the dynamic pressure bearing member 14 through adhesion. For this reason, the liquid level of the adhesive 24 is in the same position as an end surface of the opening of the dynamic pressure bearing member 14, which causes the adhesive 24 to tend to flow into a rotary shaft insertion hole and interfere with a rotary shaft.

In the example in FIG. 17, a cylindrical dyke 108 is formed on the outer circumference of one end section of a dynamic pressure bearing member 14, a groove-shaped circumferential groove 98 that is depressed in the axial direction and continuous in the circumferential direction is formed along the inner circumferential wall of the dyke 108, a flat plate-shaped cover 92 is fitted on the inner circumference side of the dyke 108, an adhesion 24 is filled in the circumferential groove 98, and the adhesive 24 is coated between an outer circumference edge section on the front surface of the cover 92 and the inner circumferential wall of the dyke 108 to fix the cover 92 to the dynamic pressure bearing member 14. According to this example, due to the fact that one end section of the dynamic pressure bearing member 14 is depressed to form the dyke 108, the dimension in the axial direction to form radial dynamic pressure bearings is limited by the height of the dyke 108, which reduced the rigidity of the dynamic pressure bearing.

SUMMARY OF THE INVENTION

The present invention is conceived in view of the problems entailed in prior arts, and relates to an oil dynamic pressure bearing motor in which the joining length between a rotary shaft and a rotary member, the thickness of a fallout preventing member, and the length of a capillary sealing section can be amply provided for, while at the same time also sufficiently ensuring a joining section between a dynamic pressure bearing member and a base plate.

In addition, the present invention also relates to an oil dynamic pressure bearing apparatus, and its manufacturing method, in which the span in the axial direction to form radial dynamic pressure bearings can be lengthened, the rigidity of the radial dynamic pressure bearings can be enhanced, the joining area between a cover that closes an opening at one end of the dynamic pressure bearing member and the dynamic pressure bearing member can be increased, and the joining strength between the two enhanced.

In accordance with an embodiment of the present invention, a motor with fluid dynamic pressure bearing includes: a dynamic pressure bearing member; a rotary shaft that rotates relatively to the dynamic pressure bearing member; lubricating oil present between the rotary shaft and the dynamic pressure bearing member; a dynamic pressure force generating structure that is formed between the rotary shaft and the dynamic pressure bearing member, that causes the lubricating oil between the rotary shaft and the dynamic pressure bearing member to generate dynamic pressure force by the rotation of the rotary shaft relative in the dynamic pressure bearing member, thereby supporting the rotary shaft in a freely rotatable manner; a rotary member that is fitted on a circumference surface of the rotary shaft and that is rotatively driven in a unitary fashion with the rotary shaft by electromagnetic drive force; an expanded diameter section formed on the dynamic pressure bearing member; a fallout preventing member that is provided on the rotary member and prevents the rotary shaft from falling out of the dynamic pressure bearing member by overlapping with the expanded diameter section of the dynamic pressure bearing member in the axial direction; a sealing section that is provided from the outer side of opposing surface in the axial direction of the fallout preventing member and the expanded diameter section and extended in the axial direction to prevent the lubricating oil from flowing out; and a concave section formed in the axial direction in at least a part of the rotary member that opposes the expanded diameter section of the dynamic pressure bearing member, wherein the expanded diameter section is placed inside the concave section, and a joining section between the rotary member and the rotary shaft overlaps the expanded diameter section in the radial direction.

In one aspect of the present embodiment, radial dynamic pressure bearings are formed on opposing surfaces in the radial direction between the rotary shaft and the dynamic pressure bearing member, and a thrust dynamic pressure bearing is formed on an end surface on the expanded diameter section of the dynamic pressure bearing member and on the opposing surface in the axial direction of the rotary member.

In another aspect of the present embodiment, lubricating oil is filled in the radial dynamic pressure bearings and the thrust dynamic pressure bearing; a tapered section is provided more on the outer side in the axial direction than the thrust dynamic pressure bearing, wherein the dimension of the tapered section between the outer circumference surface of the dynamic pressure bearing member and the opposing inner circumference surface of the fallout preventing member gradually expands towards the outer side in the axial direction, and the tapered section defines a capillary sealing section that prevents the lubricating oil from leaking and that consist of the tapered section.

In another aspect of the present embodiment, the rotary member may include a disk mounting hub that composes a part of a disk drive apparatus.

Also, the rotary member may have a drive magnet on an outer circumference side thereof, and a stator may be provided on the outer circumference side of the drive magnet, thereby composing an inner rotor-type motor.

In another aspect of the present embodiment, the motor with fluid dynamic pressure bearing may include a magnetic plate placed on the surface of a base plate opposite the drive magnet, wherein the magnetic plate generates magnetic attractive force in the direction opposite to dynamic pressure force in the thrust direction generated by the thrust dynamic pressure bearing.

In accordance with another embodiment of the present invention, an oil dynamic pressure bearing apparatus comprises a dynamic pressure bearing member, a rotary shaft that rotates relatively to the dynamic pressure bearing member, lubricating oil present in a miniscule gap between the rotary shaft and the dynamic pressure bearing member, radial dynamic pressure bearings formed between opposing surfaces in the radial direction of the rotary shaft and the dynamic pressure bearing member and with the lubricating oil intervening, and a cover that closes off one end surface of the dynamic pressure bearing member whose rotary shaft insertion hole is open. A circumferential groove that is concave in the axial direction and continuous in the circumferential direction is formed around the periphery of an opening section on one end surface of the dynamic pressure bearing member whose rotary shaft insertion hole is open. An outer circumference edge of the cover is folded in the axial direction to form a folded edge section that extends into the circumferential groove. An adhesive is filled in the circumferential groove, the folded edge section of the cover is adhered to the dynamic pressure bearing member by the adhesive inside the circumferential groove, and one end section of the bearing member is closed off by the cover.

In one aspect, the inner circumference surface of the folded edge section of the cover is in contact with the inner circumference surface of the circumferential groove of the dynamic pressure bearing member.

In another aspect, a gap is present between the folded edge section of the cover and the inner circumference surface of the circumferential groove of the dynamic pressure bearing member, wherein the gap is smaller than a gap between the folded edge section of the cover and the outer circumference surface of the circumferential groove.

In accordance with still another embodiment of the present invention, a method for manufacturing an oil dynamic pressure bearing apparatus is provided. The oil dynamic pressure bearing apparatus may include a dynamic pressure bearing member, a rotary shaft that rotates relatively to the dynamic pressure bearing member, lubricating oil present in a miniscule gap between the rotary shaft and the dynamic pressure bearing member, radial dynamic pressure bearings formed between opposing surfaces in the radial direction of the rotary shaft and the dynamic pressure bearing member and with the lubricating oil intervening, and a cover that closes off one end surface of the dynamic pressure bearing member whose rotary shaft insertion hole is open, wherein a circumferential groove that is concave in the axial direction and continuous in the circumferential direction is formed around the periphery of an opening section on one end surface of the dynamic pressure bearing member whose rotary shaft insertion hole is open, an outer circumference edge of the cover is folded in the axial direction to form a folded edge section that extends into the circumferential groove, an adhesive is filled into the circumferential groove, the folded edge section of the cover is adhered to the dynamic pressure bearing member by the adhesive inside the circumferential groove, and one end section of the bearing member is closed off by the cover. The method includes the steps of placing the dynamic pressure bearing member in a posture such that an end section on the cover mounting side is on top, placing the cover on the one end surface of the dynamic pressure bearing member from above in this posture to allow the cover's folded edge section to enter the circumferential groove, and in this state filling the adhesive into the circumferential groove such that the liquid level of the adhesive is lower than the one end surface of the dynamic pressure bearing member on the inner side of the cover's folded edge section (i.e., such that the liquid level of the adhesive is towards the bottom of the circumferential groove than the one end surface of the dynamic pressure bearing member).

In one aspect of the present embodiment, a weight is placed on top of the cover with the adhesive filled into the circumferential groove, and the adhesive is allowed to harden in this state.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIGS. 9(a), (b) and (c) show in cross section manufacturing steps in processing order of a method for manufacturing an oil dynamic pressure bearing apparatus in accordance with an embodiment of the present invention.

DESCRIPTION OF PREFERRED EMBODIMENTS

Figure 11:
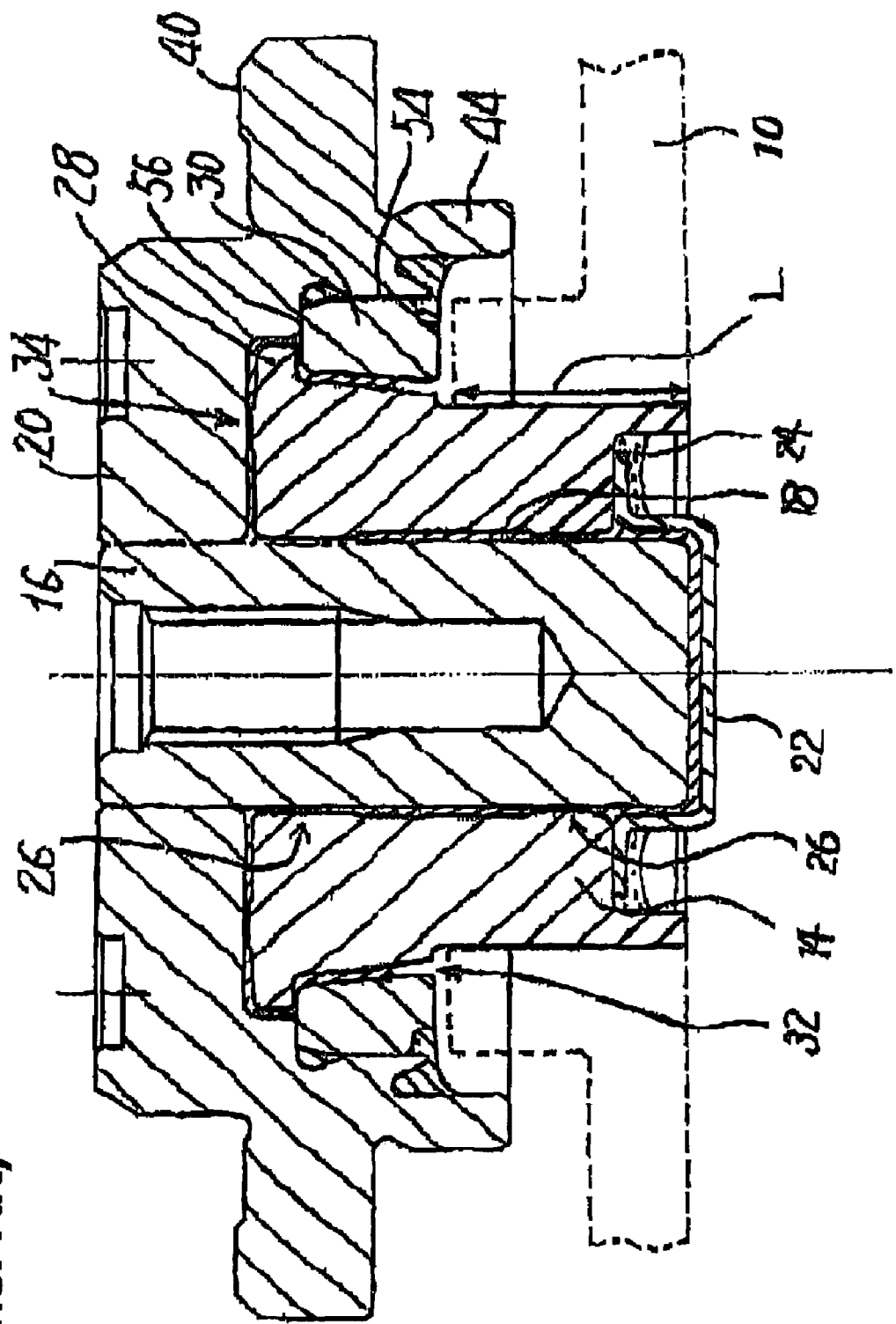
FIG. 11 is a cross-sectional view of an example of a conventional oil dynamic pressure bearing motor.
Figure 12:
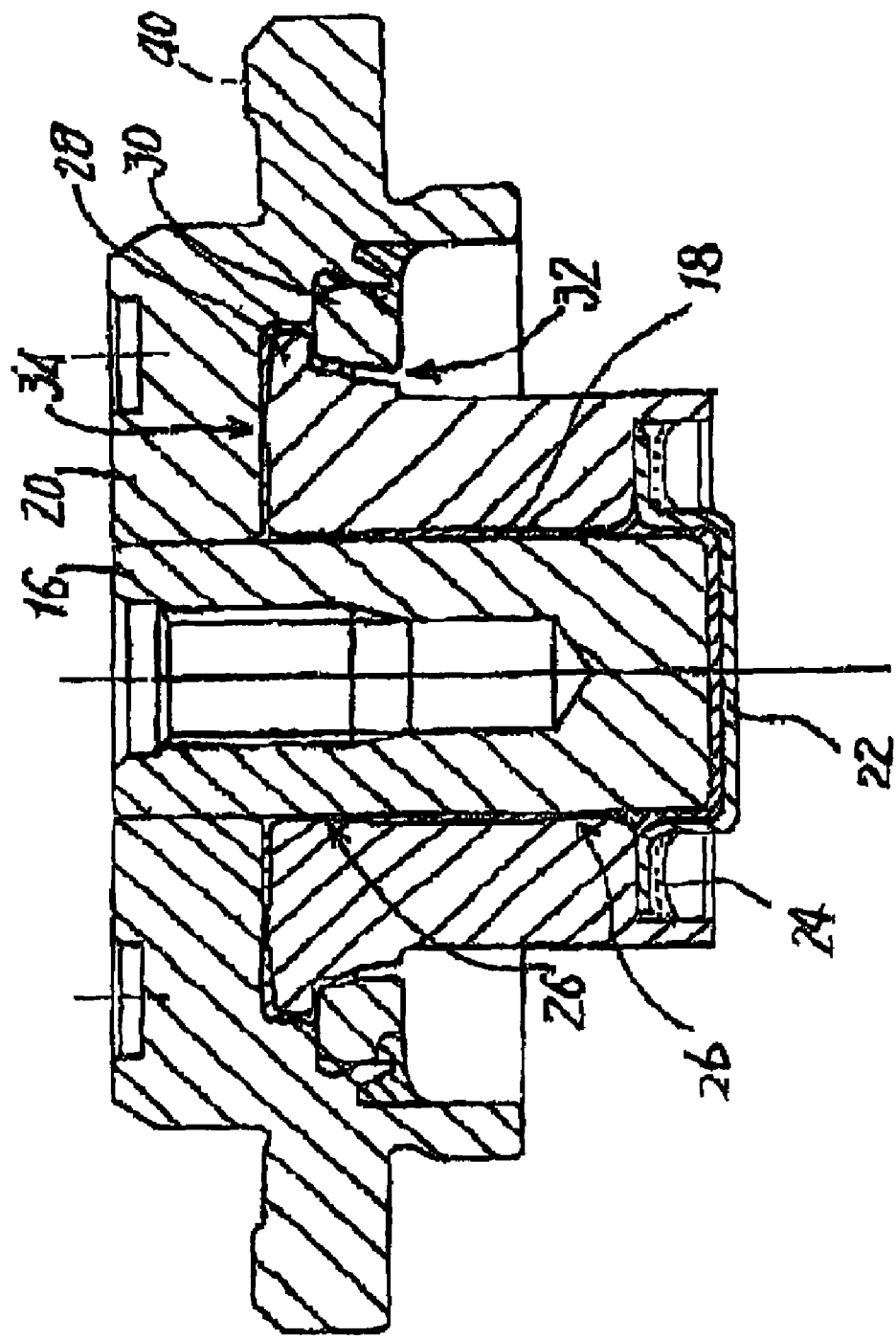
FIG. 12 is a cross-sectional view of another example of a conventional oil dynamic pressure bearing motor.
Figure 13:
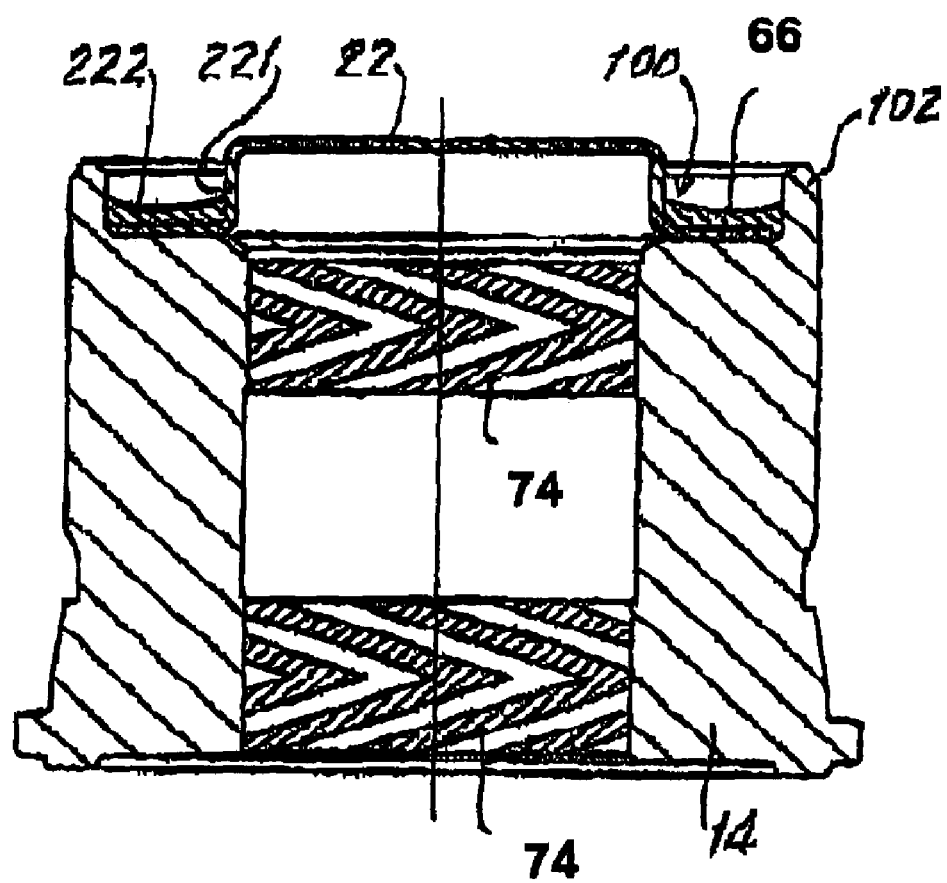
FIG. 13 is a cross-sectional view of an example of a conventional oil dynamic pressure bearing apparatus.
Figure 14:
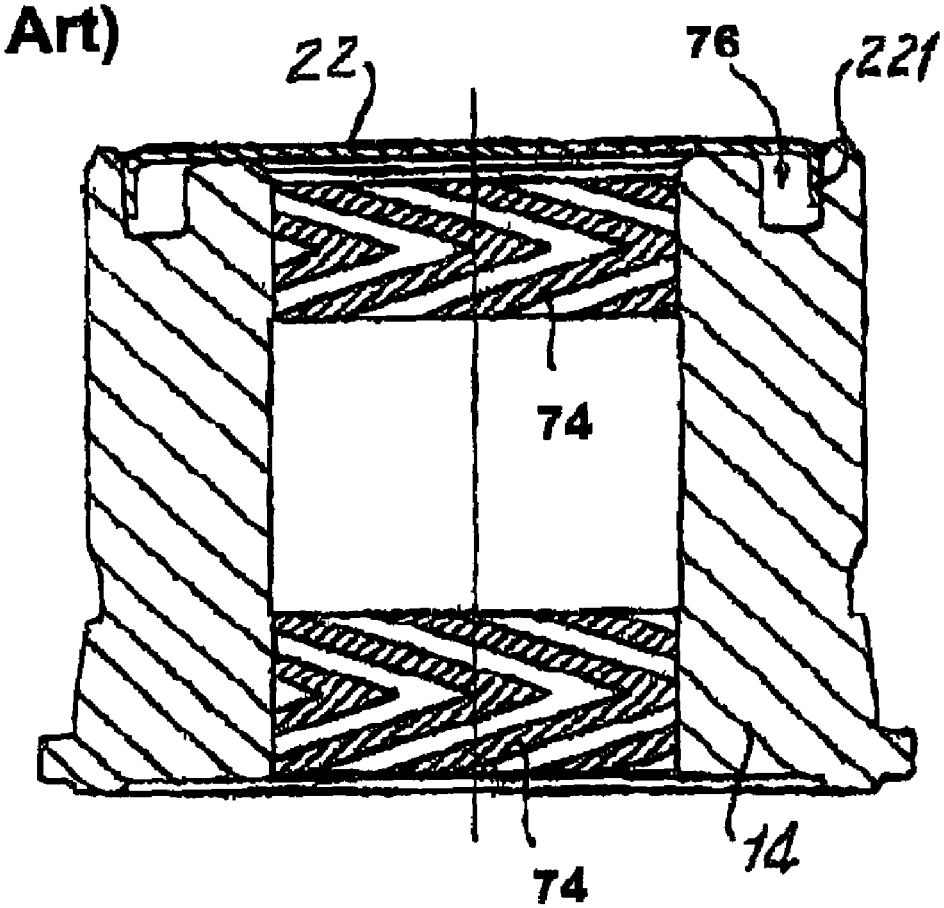
FIG. 14 is a cross-sectional view of an example of a conventional oil dynamic pressure bearing apparatus.
Figure 15:
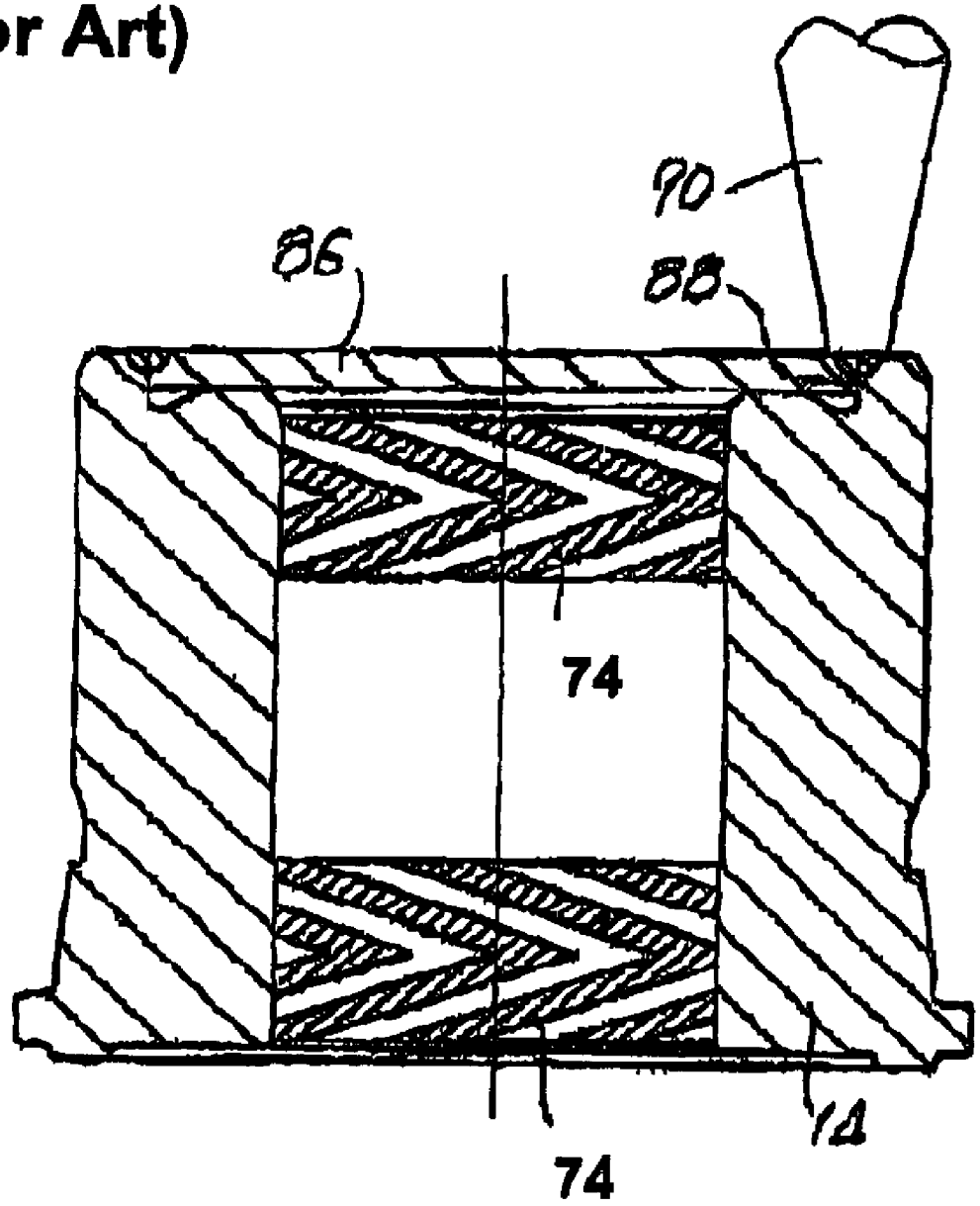
FIG. 15 is a cross-sectional view of an example of a conventional oil dynamic pressure bearing apparatus.
Figure 16:
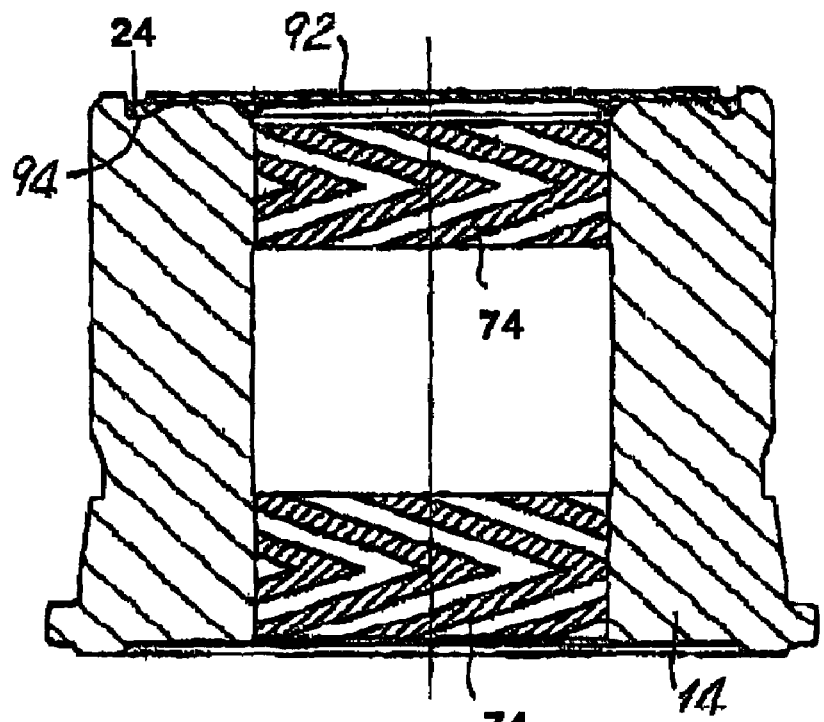
FIG. 16 is a cross-sectional view of an example of a conventional oil dynamic pressure bearing apparatus.
Figure 17:
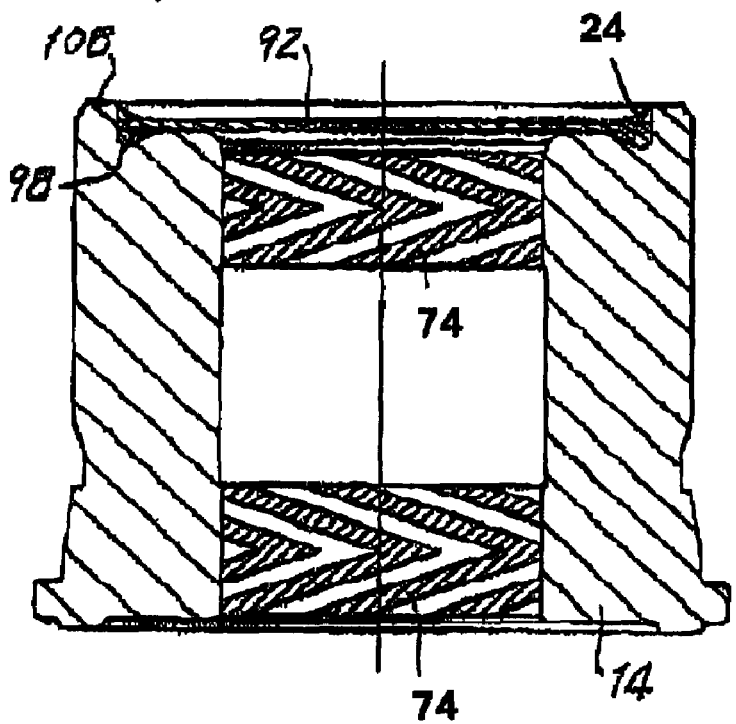
FIG. 17 is a cross-sectional view of an example of a conventional oil dynamic pressure bearing apparatus.

An oil dynamic pressure bearing motor, an oil dynamic pressure bearing apparatus and its manufacturing method in accordance with embodiments of the present invention are described below with references to the accompanying drawings. The oil dynamic pressure bearing motor according to an embodiment is structured as a disk drive apparatus that rotatively drives disks such as hard disks, but the oil dynamic pressure bearing motor according to the present invention is applicable as dynamic pressure bearing apparatuses for various equipment other than disk drive apparatuses, Like components as those in the examples shown in FIGS. 11 and 12 are assigned the same numbers.

Figure 1:
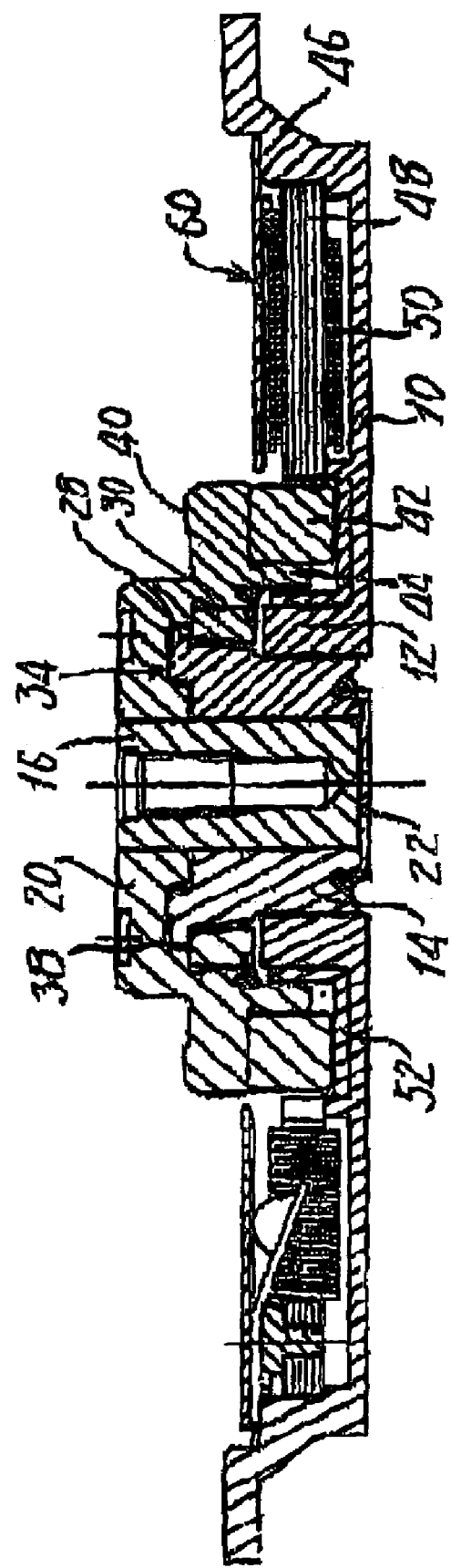
FIG. 1 is a cross-sectional view of an oil dynamic pressure bearing motor in accordance with an embodiment of the present invention.
Figure 2:
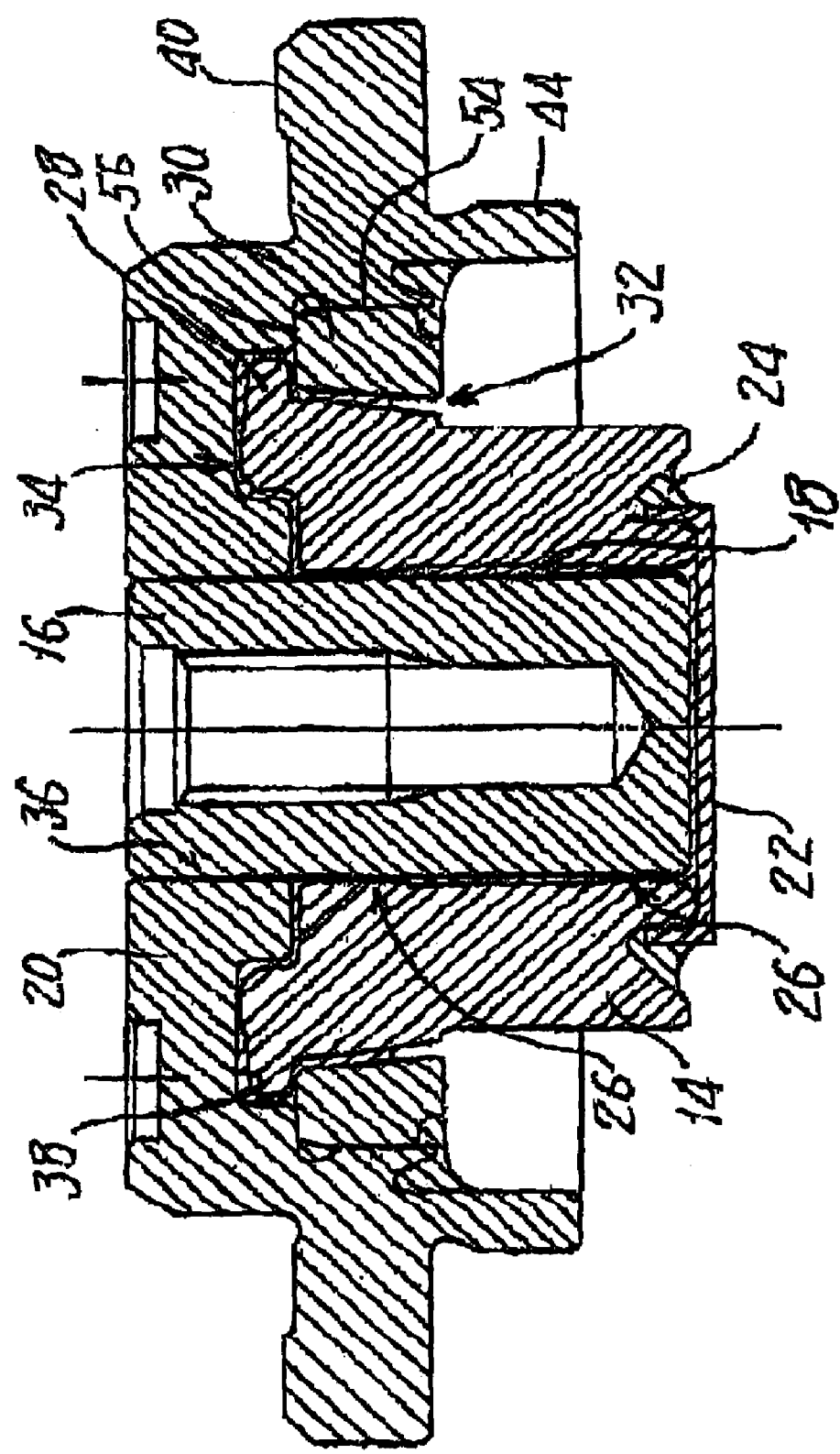
FIG. 2 is an enlarged cross-sectional view of parts of the present embodiment.

In FIGS. 1 and 2, an oil dynamic pressure bearing motor includes a rotary shaft 16 and a dynamic pressure bearing member 14. The dynamic pressure bearing member 14 is generally cylindrical, and the rotary shaft 16 is fitted into its center hole with a miniscule gap between the two members. A rotary member 20 is joined to a part of the rotary shaft 16 that protrudes above the top end of the dynamic pressure bearing member 14 through press fit. In this example, the rotary member 20 is a disk hub that rotates with the rotary shaft 16 in a unitary fashion. A disk may be mounted on the disk hub when reproducing data recorded on the disk. The rotary member 20 has a flange provided adjacent to the central area in the axial direction on the outer circumference, and a disk mounting section 40 is provided on the top surface of the flange. To prevent lubricating oil 18 that generates dynamic pressure from leaking out, joining parts between the rotary shaft 16 and the rotary member 20 are welded, or sealed by a sealing material, along the entire circumference.

The dynamic pressure bearing member 14 comprises a cylindrical section, which forms radial dynamic pressure bearings 26, 26, and an expanded diameter section 28, which forms a thrust dynamic pressure bearing 34 on the outer circumference side of the cylindrical section. The expanded diameter section 28 is formed like a flange on one end section (in the figure, on the left end section) of the cylindrical section and to protrude from one end of the cylindrical section outward in the axial direction (in the figure, from the left end towards the left). As a result, a joining section 36 between the rotary member 20 and the rotary shaft 16 overlaps in the radial direction with the expanded diameter section 28. A ceiling surface of the rotary member 20 oppose the top end surface of the dynamic pressure bearing member 14, and a concave section 38 is formed to correspond to the shape of the top end surface of the dynamic pressure bearing member 14 to take in the expanded diameter section 28. The expanded diameter section 28 is placed in the concave section 38 as if to complement the concave section 38; the expanded diameter section 28 is covered by the concave section 38 on its top surface side and on both of its lateral sides, and a gap filled with the lubricating oil 18 is formed between the opposing surfaces of the dynamic pressure bearing member 14 and the rotary member 20.

Figure 7:
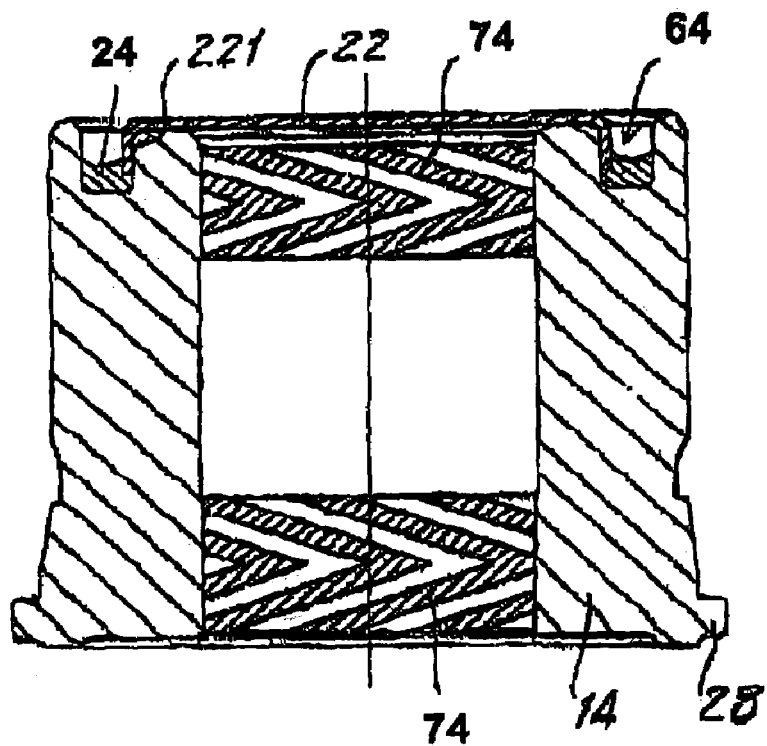
FIG. 7 is an enlarged cross-sectional view of parts of the oil dynamic pressure bearing apparatus according to the present invention, which is placed up side down.

On the inner circumference surface of the cylindrical section of the dynamic pressure bearing member 14 are formed radial dynamic pressure generating grooves 74, 74 near both ends in the axial direction, as shown in FIG. 7, and on the top surface of the expanded diameter section 28 are formed thrust dynamic pressure generating grooves. The radial dynamic pressure generating grooves 74, 74 are formed along the entire circumference at two locations spaced a distance from each other on the inner circumference surface of the cylindrical section of the dynamic pressure bearing member 14. The thrust dynamic pressure generating grooves are also formed along the entire circumference on the top surface of the expanded diameter section 28. These dynamic pressure generating grooves comprise a dynamic pressure generating structure, in which the rotation of the rotary shaft 16 relative to the dynamic pressure bearing member 14 causes dynamic pressure force to be generated in the lubricating oil 18 that is between the rotary shaft 16 and the dynamic pressure bearing member 14, thereby supporting the rotary shaft 16 in a freely rotatable manner.

The rotary shaft 16 that is press fit in a unitary fashion with the rotary member 20 is inserted from above into the cylindrical section of the dynamic pressure bearing member 14. From the bottom on the outer circumference of the dynamic pressure bearing member 14, a ring-shaped fallout preventing member 30 is inserted and joined to an inner circumference surface 54 of the rotary member 20. The rotary member 20 has a flat step section 56 that is continuous with the inner circumference surface 54, and the fallout preventing member 30 is joined also to the step section 56. Furthermore, to prevent the lubricating oil 18, described later, from leaking, a joining section between the fallout preventing member 30 and the rotary member 20 is sealed with an adhesive. The fallout preventing member 30 is positioned below the expanded diameter section 28 of the dynamic pressure bearing member 14, and the fallout preventing member 30 overlaps with the outer circumference edge section of the expanded diameter section 28 with a miniscule gap in the axial direction in between.

At the bottom end of the dynamic pressure bearing member 14, a concentric circumferential groove 64 is formed along the entire circumference, as described later, and a flat cap-shaped cover 22 is placed in the circumferential groove 64, such that a bottom end opening of the dynamic pressure bearing member 14 is closed off by the cover 22 (see FIG. 7). The outer circumference section of the cover 22 is sealed with the adhesive 24 in the circumferential groove 64 at the bottom end of the dynamic pressure bearing member 14.

Between the inner circumference surface of the fallout preventing member 30 and the opposing outer circumference surface of the dynamic pressure bearing member 14, between the top surface of the fallout preventing member 30 and the opposing bottom surface of the expanded diameter section 28 of the dynamic pressure bearing member 14, between the outer circumference surface of the expanded diameter section 28 and the opposing circumferential wall surface of the rotary member 20, between a ceiling surface of the rotary member 20 and the opposing top surface of the expanded diameter section 28, between the inner circumference surface of the dynamic pressure bearing member 14 and the opposing outer circumference surface of the rotary shaft 16, and between the cover 22 and the bottom end surface of the rotary shaft 16 is formed a gap in each case. These gaps are mutually communicated with each other in the sequence, described above and are filled with the lubricating oil 18. The gap between the inner circumference surface of the fallout preventing member 30 and the opposing outer circumference surface of the dynamic pressure bearing member 14 is open towards the bottom. Further, the outer circumference surface of the dynamic pressure bearing member 14 that opposes the inner circumference surface of the fallout preventing member 30 is a tapered section whose outer diameter becomes smaller towards the bottom. As a result, the gap between the inner circumference surface of the fallout preventing member 30 and the outer circumference surface of the dynamic pressure bearing member 14 forms a capillary sealing section 32 whose dimension gradually enlarges towards the bottom, as shown in the figure. The liquid level of the lubricating oil 18 is in the capillary sealing section 32.

The lubricating oil 18 is poured into the gaps through the capillary sealing section 32. The thrust dynamic pressure bearing 34 is formed between the ceiling surface of the concave section 38 of the dynamic pressure bearing member 14 and the opposing top surface of the expanded diameter section 28, and the radial dynamic pressure bearings 26, 26 are formed at two locations separated from each other between the inner circumference surface of the dynamic pressure bearing member 14 and the outer circumference surface of the rotary shaft 16. The lubricating oil 18 is present in these dynamic pressure bearings.

As shown in FIG. 1, the outer circumference of approximately half of the bottom of the dynamic pressure bearing member 14 is fitted and fixed to the inner circumference side of a cylindrical section 12 formed in the center section of a base plate 10. The cylindrical section 12 of the base plate 10 extends into the rotary member 20 to reach near the fallout preventing member 30. The base plate 10 has a circumferential wall 46 on its outer circumference side, and on the inner circumference side of the circumferential wall 46 is fixed a stator 60. The stator 60 has a core 48 and drive coils 50 that are wound around a plurality of salient poles, which are in a unitary structure with the core 48; the outer circumference surface of the core 48 is fixed to the inner circumference surface of the circumferential wall 46. Tips of the plurality of salient poles face toward the center of the motor.

A cylindrical circumferential wall 44 protrudes at the bottom end of the rotary member 20, and a ring-shaped drive magnet 42 is mounted on the outer circumference surface of the circumferential wall 44. The drive magnet 42, the rotary member 20 and the rotary shaft 16 make up a rotor of the motor. The tip surfaces of the salient poles of the core 48 that comprise the stator 60 oppose the outer circumference surface of the drive magnet 42 across an appropriate distance, and the rotor is rotatively driven by switching energization provided to the drive coils 50. In this way, the embodiment shown in FIGS. 1 and 2 forms an inner rotor-type oil dynamic pressure bearing motor.

As shown in FIG. 1, on the top surface of the base plate 10 is fixed a ring-shaped magnetic plate 52, whose cross section is L-shaped, surrounding the cylindrical section 12. A flat part of the magnetic plate 52 opposes the bottom surface of the drive magnet 42 across an appropriate distance. Between the magnetic plate 52 and the drive magnet 42 is generated magnetic attractive force in the thrust direction. This magnetic attractive force is in the direction opposite to the dynamic pressure force in the thrust direction that is generated in the thrust dynamic pressure bearing 34 as a result of the rotation of the rotary member 20. The balance between the force in the thrust direction generated in the thrust dynamic pressure bearing 34 as a result of the rotation of the rotary member 20 and the magnetic attractive force in the thrust direction causes the position of the rotary member 20 in the axial direction to be maintained with high precision.

The lubricating oil 18 is filled into the gaps through the capillary sealing section 32. Any filling method may be used, such as filing the lubricating oil 18 while the gaps are in a vacuum or negative pressure state. The lubricating oil 18 is present in the thrust dynamic pressure bearing 34 and in the top and bottom radial dynamic pressure bearings 26, 26.

By switching the energization provided to the drive coils 50 of the oil dynamic pressure bearing motor according to the rotation position of the drive magnet 42, the magnetic attraction-repulsion force between the salient poles of the stator core 48 and the drive magnet 42 of the rotor causes the rotor including the drive magnet 42, the rotary member 20 and the rotary shaft 16 to be rotatively driven. The rotation of the rotor causes thrust dynamic pressure force to be generated in the lubricating oil 18 present in the thrust dynamic pressure bearing 34, as well as radial dynamic pressure to be generated in the lubricating oil 18 present in the radial dynamic pressure bearings 26, 26, thereby causing the rotary shaft 16 and the rotary member 20 to rotate relatively to the dynamic pressure bearing member 14 while maintaining a non-contact state with the dynamic pressure bearing member 14.

According to the present embodiment, the expanded diameter section 28 is formed on the dynamic pressure bearing member 14; the fallout preventing member 30, which prevents the rotary shaft 16 from falling out of the dynamic pressure bearing member 14 by overlapping in the axial direction with the expanded diameter section 28, is provided on the rotary member 20; and a sealing section 32 that prevents the lubricating oil 18 from flowing out is provided from the outer side of the opposing surfaces in the axial direction of the fallout preventing member 30 and the expanded diameter section 28 and extends in the axial direction. In addition, the concave section 38 that recedes in the axial direction is formed in at least the part of the rotary member 20 that opposes the expanded diameter section 28, and the expanded diameter section 28 is placed within the concave section 38. As a result, the joining section 36 between the rotary member 20 And the rotary shaft 16 overlaps the expanded diameter section 28 in the radial direction. For this reason, the thickness of the part of the rotary member 20 that contains the expanded diameter section 28 of the dynamic pressure bearing member 14 can be made thinner than the thickness (i.e., the length in the axial direction) of the joining section 36 between the rotary member 20 and the rotary shaft 16. Consequently, while restricting the dimension of the motor as a whole in the height direction (i.e., in the axial direction of the motor) by that much, the length of the joining section 36 between the rotary member 20 and the rotary shaft 16 can be amply ensured, which in turn ensures proper perpendicularity precision between the rotary member 20 and the rotary shaft 16. As a result, when the motor is used as a disk drive motor, the swing of the disk can be reduced and the reliability of the thrust bearing can be improved.

Furthermore, due to the fact that the thickness of the part of the rotary member 20 that contains the expanded diameter section 28 of the dynamic pressure bearing member 14 can be made thinner as described above, the length of the capillary sealing section 32 in the axial direction can be lengthened by that much to achieve a sufficient capillary sealing length. Since this ensures sufficient amount of the lubricating oil 18 and the capillary sealing section 32 therefore has high sealing effect, a dynamic pressure bearing with high reliability can be obtained. Moreover, due to the fact that a sufficiently long joining length between the dynamic pressure bearing member 14 and the base plate 10 can be ensured, sufficiently large joining strength can be obtained, which results in an oil dynamic pressure bearing motor with greater resistance to vibration and/or impact from outside.

The thrust dynamic pressure bearing 34 may have spiral dynamic pressure grooves. As the rotor rotates, the lubricating oil 18 is introduced into the spiral dynamic pressure grooves to increase the dynamic pressure force inside the bearing, and the rotary member 20 levitates from the dynamic pressure bearing member 14. The lubricating oil 18 on an end surface in the axial direction of the dynamic pressure bearing 14 and more on the inner circumference side than the thrust dynamic pressure bearing 34, i.e., the lubricating oil 18 in the capillary sealing section 32, is more prone to leaking out due to centrifugal force. However, if the amount of the lubricating oil 18 that moves as a result of pumping effect generated by the spiral dynamic pressure grooves is greater than the amount of the lubricating oil 18 that moves as a result of centrifugal force, the lubricating oil 18 would not leak. Furthermore, by pressurizing the interior of the bearing with predetermined pumping force, the rotary member 20 can be efficiently levitated up from the dynamic pressure bearing member 14.

Figure 3:
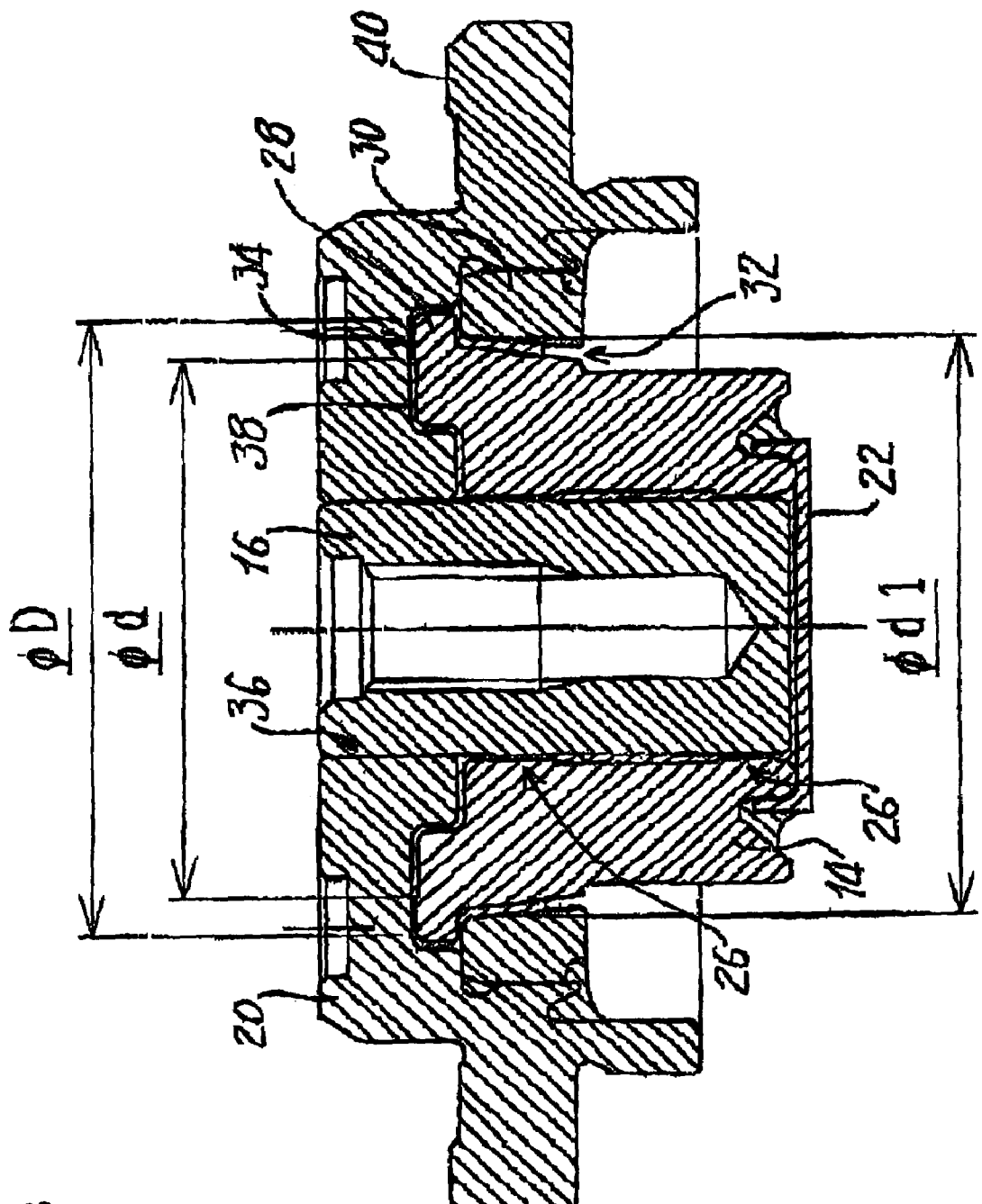
FIG. 3 is a cross-sectional view of an oil dynamic pressure bearing motor in accordance with another embodiment of the present invention.

An embodiment shown in FIG. 3 incorporates the mechanism described above. For example, a thrust dynamic pressure bearing 34 is formed at a position closest to the outer diameter of an expanded diameter section 28, such that when the diameter of a capillary sealing section 32 is $\Phi d1$, the diameter on the inner circumference side of spiral dynamic pressure grooves of the thrust dynamic pressure bearing 34 is $\Phi d$, and the diameter on its outer circumference side is $\Phi D$, a relation $\Phi d < \Phi d1 < \Phi D$ is established. In other words, the diameter $\Phi d1$ of the capillary sealing section 32 is in a range in the radial direction in which the spiral dynamic pressure grooves are formed. As a result, the amount of the lubricating oil that moves as a result of the pumping force in the spiral dynamic pressure grooves is greater than the amount of the lubricating oil that moves as a result of centrifugal force of the capillary sealing section 32, such that the lubricating oil would not leak and the interior of the thrust dynamic pressure bearing 34 is effectively pressurized.

Figure 4:
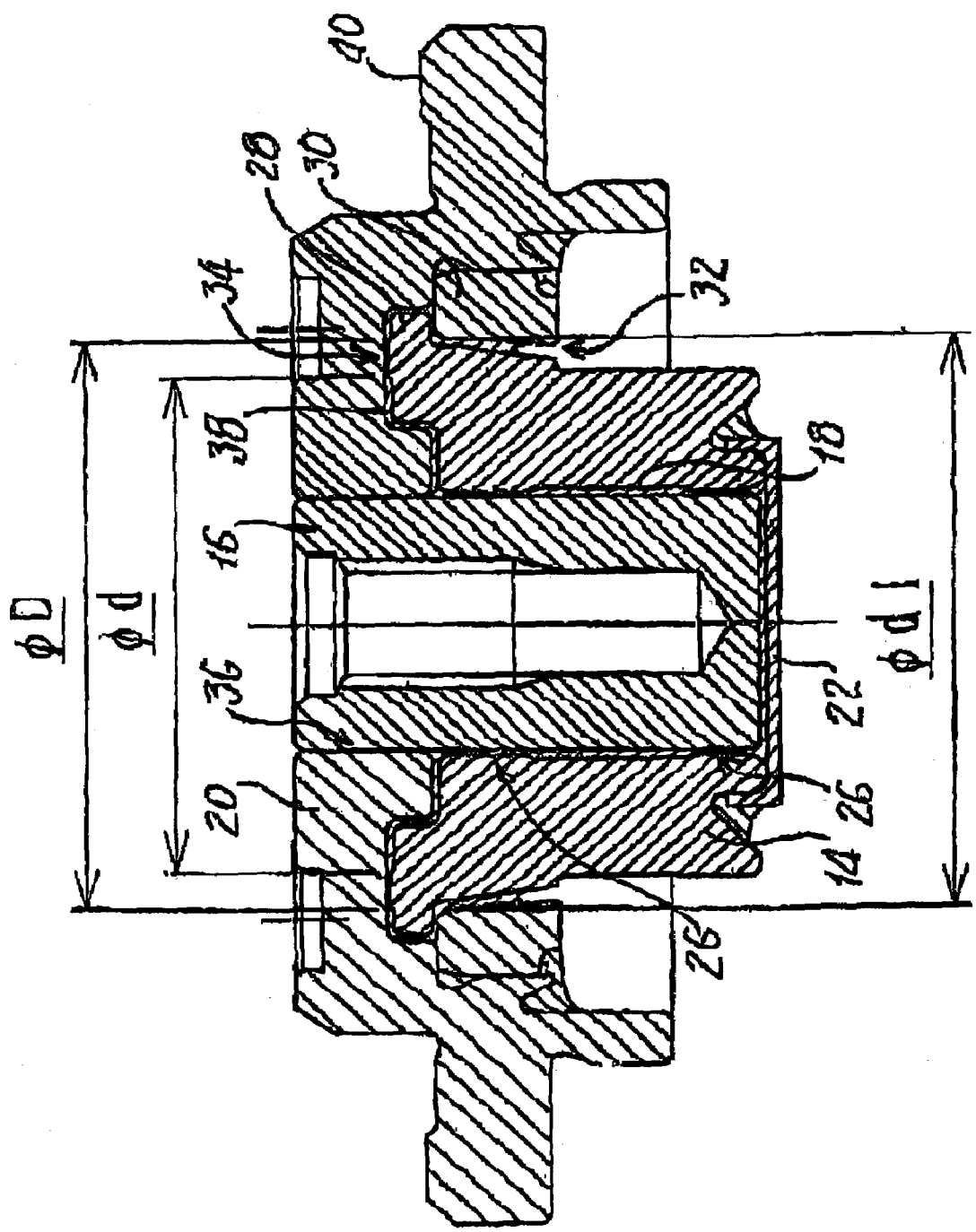
FIG. 4 is a cross-sectional view of an oil dynamic pressure bearing motor in accordance with another embodiment of the present invention.

In an embodiment shown in FIG. 4, a thrust dynamic pressure bearing 34 is displaced towards the inner circumference side from the outer diameter of an expanded diameter section 28 of a dynamic pressure bearing member 14 to be provided somewhere between the outer diameter and inner diameter of the expanded diameter section 28, such that the diameter $\Phi d1$ of a capillary sealing section 32 and the diameter $\Phi D$ on the outer circumference side of spiral dynamic pressure grooves of the thrust dynamic pressure bearing 34 are virtually equivalent. According to this embodiment, although centrifugal force is applied to lubricating oil in the periphery of the expanded diameter section 28, it would not leak.

Figure 5:
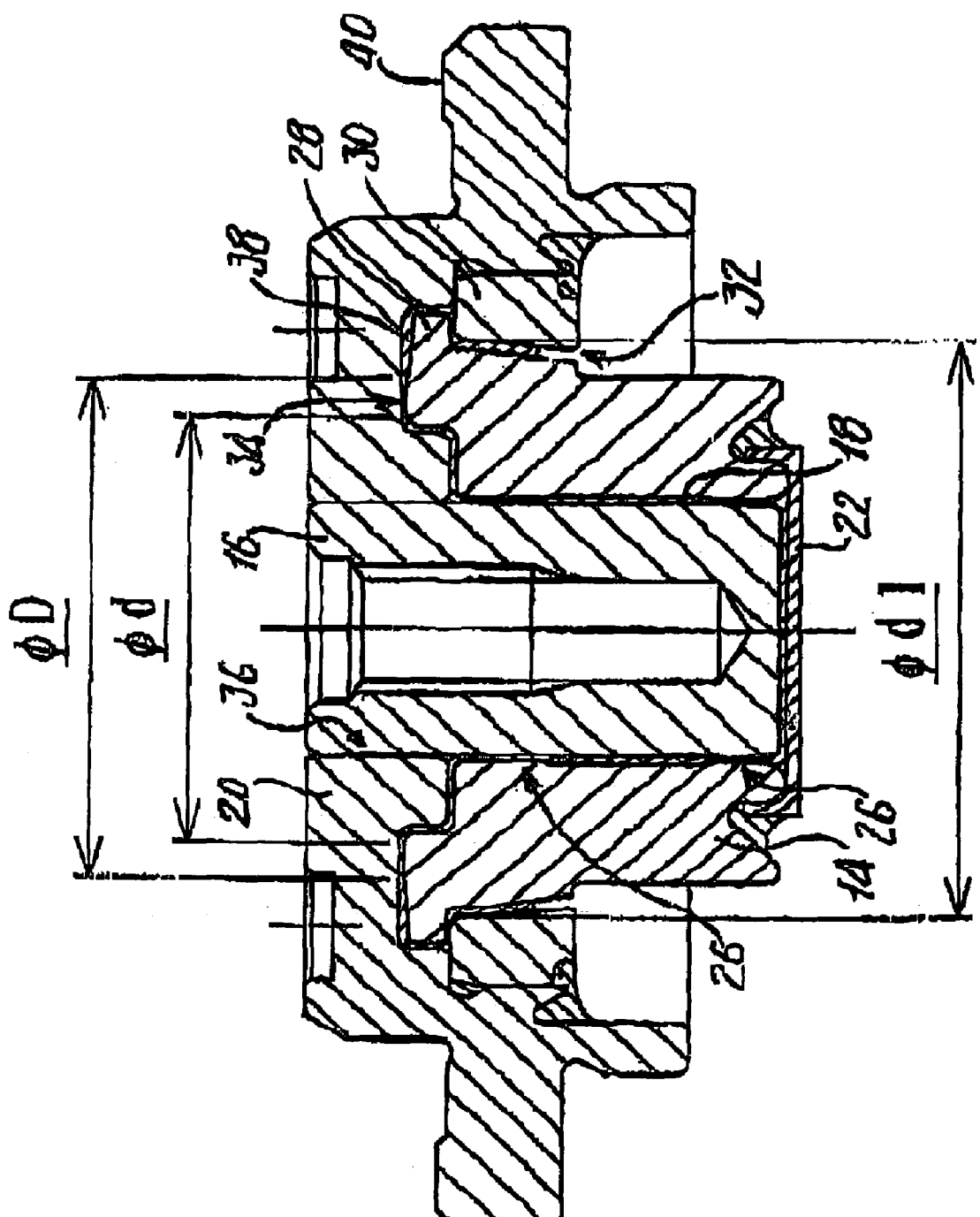
FIG. 5 is a cross-sectional view of an oil dynamic pressure bearing motor in accordance with another embodiment of the present invention.

In an embodiment shown in FIG. 5, a thrust dynamic pressure bearing 34 is formed in a position closest to the inner diameter of an expanded diameter section 28, such that $\Phi D < \Phi d1$. In this embodiment, the thrust dynamic pressure bearing 34 is more on the inner side than in the embodiment shown in FIG. 4. As a result, although torque loss of the thrust dynamic pressure bearing 34 is smaller and power consumption can be reduced, centrifugal force applied to oil in a capillary sealing section 32 would rely only on capillary sealing force, and low rotational speed or small diameter of the thrust dynamic pressure bearing 34 would have to be accepted.

Figure 6:
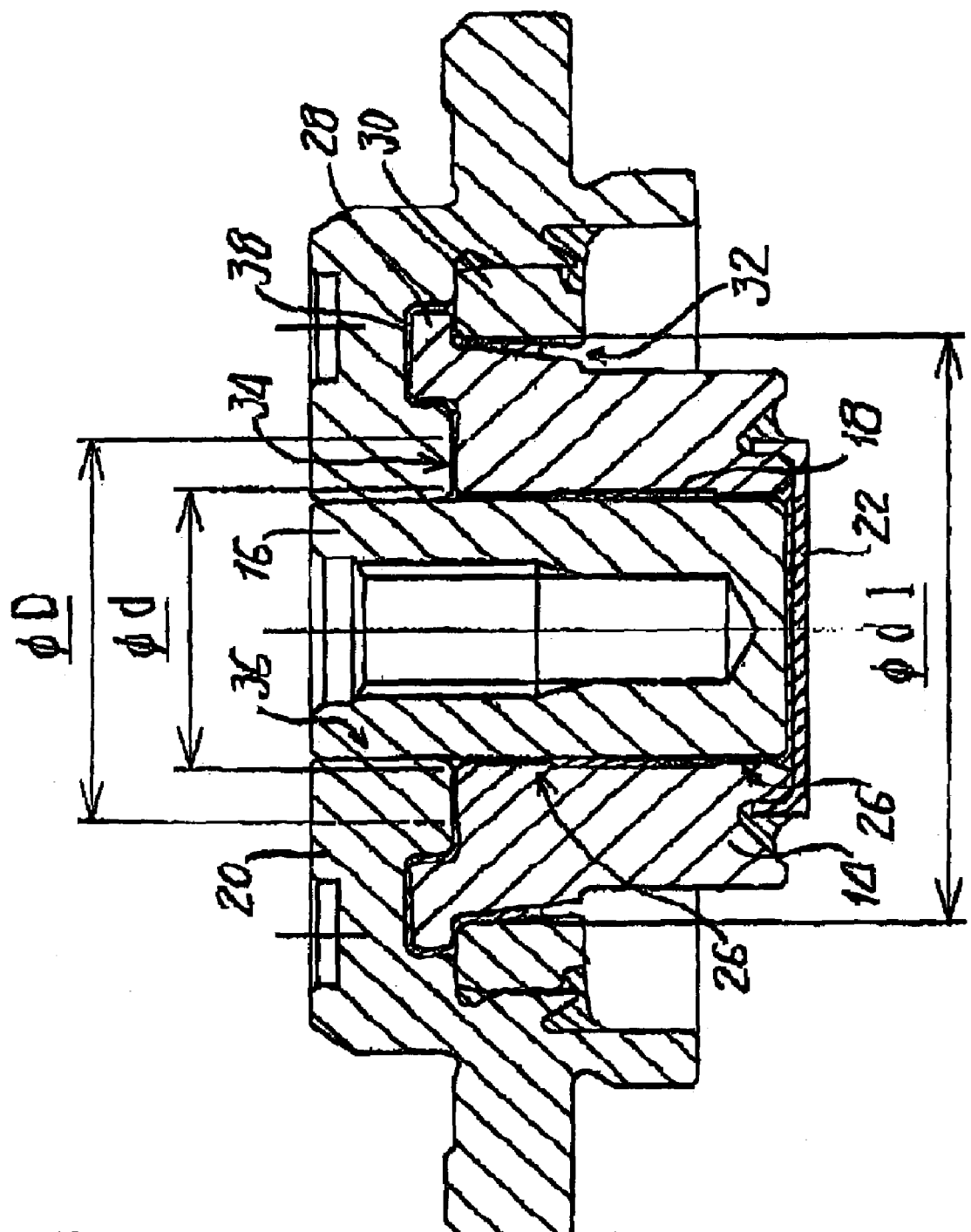
FIG. 6 is a cross-sectional view of an oil dynamic pressure bearing motor in accordance with another embodiment of the present invention.

In an embodiment shown in FIG. 6, a thrust dynamic pressure bearing 34 is formed between opposing surfaces in the axial direction of a rotary member 20 and a dynamic pressure bearing member 14 and further towards the inner diameter than an expanded diameter section 28. According to this embodiment, the oil leak situation is even more critical than in the embodiment in FIG. 5, such that a rotational speed that is even slower than in the embodiment in FIG. 6 would be a precondition. In the embodiments shown in FIGS. 5 and 6, by providing an efficient inflow angle of the lubricating oil into the spiral dynamic pressure grooves that make up the thrust dynamic pressure bearing 34, necessary dynamic pressure force can be obtained even with low rotational speed.

The embodiments shown in FIGS. 5 and 6 entail difficult conditions with regard to the lubricating oil leak. However, on the other hand, if rotational speed and thrust bearing diameter conditions that would not cause the lubricating oil to leak are provided, the torque loss of the thrust dynamic pressure bearing can be decreased, which results in an advantage of being able to reduce power consumption of the dynamic pressure bearing motor to an extremely low level. For example, since motors used in hard disk drive apparatuses for mobile terminals especially require low power consumption, these embodiments are suited for such uses, and the effect is further enhanced by the addition of lower torque loss.

Next, a structure that closes off one end surface of the dynamic pressure bearing member 14 is described. On one end surface of the dynamic pressure bearing member 14, specifically the right end surface in FIG. 1 or the top end surface in FIG. 7, the cover 22 is fixed, such that an opening at one end surface of the dynamic pressure bearing member 14 is closed off by the cover 22. On one end surface of the dynamic pressure bearing member 14, the concentric circumferential groove 64 that is concave in the axial direction and continuous along the entire circumference in the circumferential direction is formed around the periphery of an opening section of a rotary shaft insertion hole. The cover 22 is a flat, cup-shaped member whose outer circumference edge section is folded in the axial direction to form a folded edge section 221, such that the folded edge section 221 of the cover 22 is placed in the circumferential groove 64 of the dynamic pressure bearing member 14. The inner circumference surface of the folded edge section 221 of the cover 22 is in contact with the surface on the inner circumference side of the circumferential groove 64 of the dynamic pressure bearing member 14. The adhesive 24 is coated on or filled in the circumferential groove 64, the folded edge section 221 of the cover 22 is fixed by the adhesive 24 to one end of the dynamic pressure bearing member 14, and one end surface of the dynamic pressure bearing member 14 is thereby closed off by the cover 22.

In other words, the circumferential groove 64 that is depressed in the axial direction and continuous in the circumferential direction is formed around the periphery of the opening section on one end surface of the dynamic pressure bearing member 14 whose rotary shaft insertion hole is open, the cover 22 whose outer circumference edge is folded in the axial direction to form the folded edge section 221 has its folded edge section 221 extending into the circumferential groove 64, the adhesive 24 is filled into the circumferential groove 64, the folded edge section 221 of the cover 22 is adhered to the dynamic pressure bearing member 14 by the adhesive 24 inside the circumferential groove 64, such that one end section of the dynamic pressure bearing member 14 is closed off by the cover 22. As a result, the joining area between the cover 22 and the dynamic pressure bearing member 14 is enlarged, which enhances the joining strength between the two.

By having a structure as described above, the placement of the radial dynamic pressure bearings 26, 26 can be virtually along the entire length in the axial direction of the dynamic pressure bearing member 14; since this allows the span of the radial dynamic pressure bearings 26, 26 in the axial direction to be long, the rigidity of the bearing in the radial direction can be enhanced while making the dynamic pressure bearing member 14 thinner. In addition, due to the fact that the joining length between the dynamic pressure bearing member 14 and the base plate 10 can be provided with sufficient length, the joining strength between the dynamic pressure bearing member 14 and the base plate 10 can be enhanced.

The adhesive 24 that adheres the cover 22 is retained within the ring-shaped circumferential groove 64 formed on one end surface of the dynamic pressure bearing member 14. Since the adhesive 24 does not flow out or seep out from one end surface of the dynamic pressure bearing member 14, it does not cause any failures in the joining between the dynamic pressure bearing member 14 and the base plate 10, or be an impediment to achieving a thinner dynamic pressure bearing apparatus.

Due to the fact that the liquid level of the adhesive 24 that adheres the cover 22 is lower than the position of the end surface of the dynamic pressure bearing member 14 covered with the cover 22 and is more towards the bottom of the circumferential groove 64 than the position of the end surface of the dynamic pressure bearing member 14, the adhesive 24 does not flow into the bearing or interfere with the rotary shaft 16.

Figure 10:
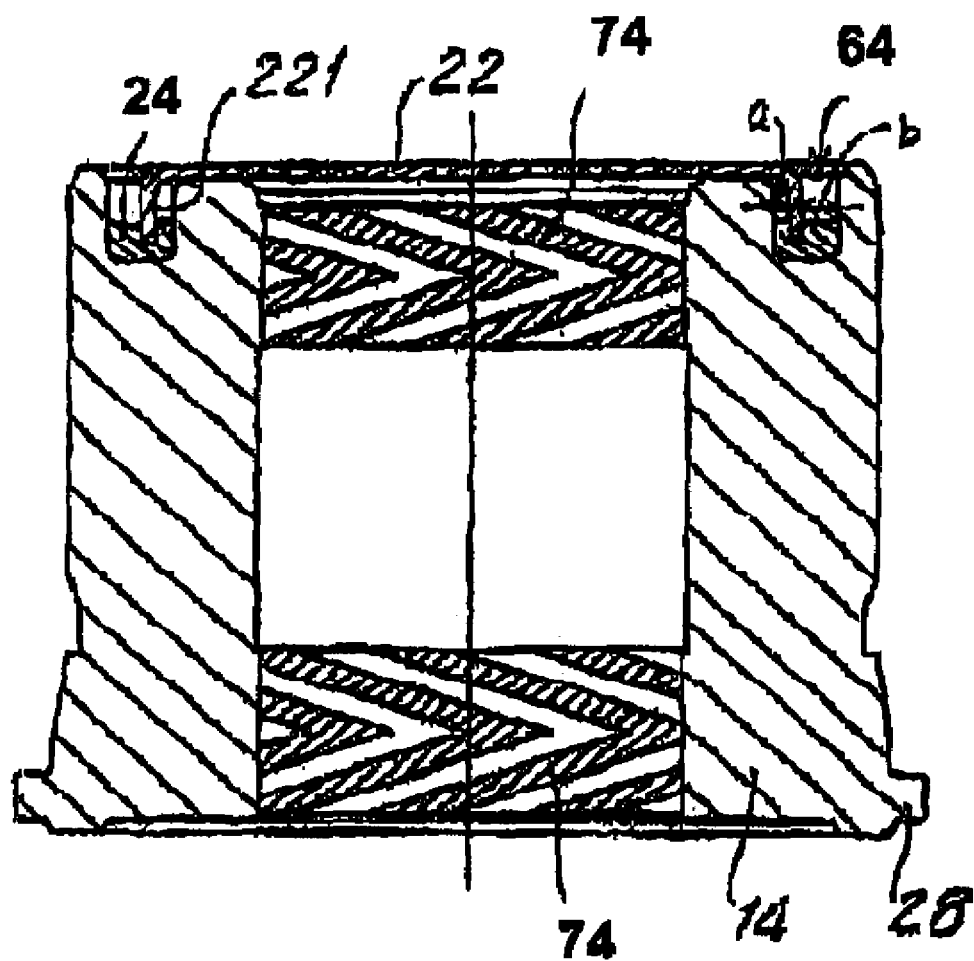
FIG. 10 is an enlarged cross-sectional view of an oil dynamic pressure bearing apparatus in accordance with another embodiment of the present invention, which is positioned up side down.

The structure shown in FIGS. 1 and 7 has been described as an embodiment in which the inner circumference surface of the folded edge section 221 of the cover 22 is in contact with the surface on the inner circumference side of the circumferential groove 64 of the dynamic pressure bearing member 14, but there may be a gap "a" between the inner circumference surface of a folded edge section 221 of a cover 22 and the surface on the inner circumference side of a circumferential groove 64, as shown in an embodiment in FIG. 10. However, the gap "a" may preferably be smaller than a gap "b" between the folded edge section 221 of the cover 22 and the surface on the outer circumference side of the circumferential groove 64. This is due to the fact that the penetrating power of an adhesive resulting from capillarity is larger the smaller the gap. In other words, when the gap "a" is smaller than the gap "b", an adhesive 24 penetrates with greater penetrating power into the small gap "a" between the inner circumference surface of the folded edge section 221 of the cover 22 and the surface on the inner circumference side of the circumferential groove 64, which reliably lengthens the length of the adhesive 24 that flows into a joining section, thereby enhancing the joining strength.

Next, a method for manufacturing the dynamic pressure bearing apparatus, especially a method for assembling the joining section between the cover 22 and the dynamic pressure bearing member 14, in accordance with an embodiment of the present invention, are described with reference to FIGS. 9(*a*), (*b*) and (*c*). First, as shown in FIG. 9(*a*), the dynamic pressure bearing member 14 is placed up side down so that a cover mounting side is on top, and the cover 22 is placed on one end surface, i.e., the top end surface in FIG. 9(*a*), of the dynamic pressure bearing member 14. The cover 22 is flat, cup-shaped and has the circumferential wall 221; the circumferential wall 221 of the cover 22 is allowed to enter the circumferential groove 64 along the wall surface on the inner circumference side of the circumferential groove 64 of the dynamic pressure bearing member 14.

Next, as shown in FIG. 9(*b*), the tip of a needle 68 of an adhesive coating apparatus is directed towards the circumferential groove 64, and the adhesive 24 is filled into the circumferential groove 64 while the dynamic pressure bearing member 14 is rotated or the needle 68 is moved. This seals the periphery of the cover 22. In this state, a weight 69 is placed on top of the cover 22 as shown in FIG. 9(*c*), and the adhesive 24 is allowed to harden in this new state.

Figure 8:
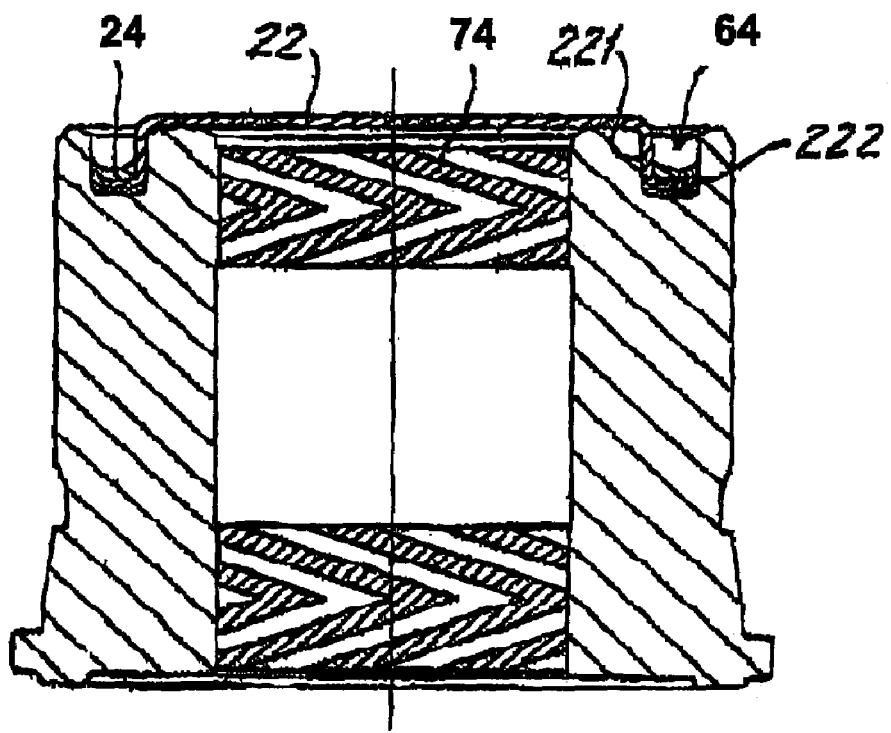
FIG. 8 is an enlarged cross-sectional view of an oil dynamic pressure bearing apparatus in accordance with another embodiment of the present invention, which is placed up side down.

Next, a method for assembling the joining section between the cover 22 and the dynamic pressure bearing member 14 in accordance with another embodiment shown in FIG. 8 is described. This embodiment differs from the embodiment in FIGS. 1 and 7 in that a flange section 222, which is continuous with a circumferential wall 221 of a cover 22, is formed by bending an end edge section of the circumferential wall 221 outward and perpendicularly. The flange section 222 is placed within a circumferential groove 64 of a dynamic pressure bearing member 14, and an adhesive 24 filled into the circumferential groove 64 adheres and fixes the flange section 222 to the dynamic pressure bearing member 14. According to this embodiment, the adhesion area of the cover 22 with the dynamic pressure bearing member 14 can be enlarged, which allows the cover 22 to be more firmly fixed.

Although all of the embodiments shown in the drawings are inner rotor-type motors, the present invention can be applied to outer rotor-typo motors as well.

The oil dynamic pressure bearing motor according to the present invention can be used not only as a disk drive motor, but also as a drive motor for various rotating bodies.

In the present invention, a concave section that recede in the axial direction is provided in at least a part of a rotary member that opposes an expanded diameter section, and the expanded diameter section is placed inside the concave section, such that a joining section between the rotary member and a rotary shaft overlaps in the radial direction with the expanded diameter section. For this reason, the thickness of the part of the rotary member that contains the Expanded diameter section of the dynamic pressure bearing member can be made thinner than the thickness of the joining section between the rotary member and the rotary shaft. Consequently, while restricting the dimension of the motor as a whole in the height direction by that much, the length of the joining section between the rotary member and the rotary shaft can be amply ensured, which in turn ensures proper perpendicularity precision between the rotary member and the rotary shaft.

Furthermore, when the oil dynamic pressure bearing motor according to the present invention is used as a motor for a disk drive apparatus whose rotary member is a disk mounting hub, the swing of the disk during rotation can be reduced, which can enhance the rotational speed and recording density of the disk.

In addition, the length of a capillary sealing section can be made longer, which increases the amount of lubricating oil and makes it possible to obtain an oil dynamic pressure bearing motor with a long life.

The joining length between a base plate and a dynamic pressure bearing member can be lengthened, and the joining force between the two enhanced, according to the present invention.

Moreover, according to the present invention, a circumferential groove that is concave in the axial direction and continuous in the circumferential direction is formed around the periphery of an opening section on one end surface of the dynamic pressure bearing member whose rotary shaft insertion hole is open, a cover whose outer circumference edge is folded in the axial direction to form a folded edge section has its folded edge section extending into the circumferential groove, an adhesive is filled into the circumferential groove, the folded edge section of the cover is adhered to the dynamic pressure bearing member by the adhesive inside the circumferential groove, such that one end section of the dynamic pressure bearing member is closed off by the cover. As a result, the joining area between the cover and the dynamic pressure bearing member is enlarged, which enhances the joining strength between the two.

By having a structure as described above, the span in the axial direction in which radial dynamic pressure bearings can be positioned can be virtually the entire length in the axial direction of the dynamic pressure bearing member, which can enhance the rigidity of the bearing in the radial direction.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor with fluid dynamic pressure bearing comprising:
   a dynamic pressure bearing member;
   a rotary shaft that is rotatively supported by the dynamic pressure bearing;
   a rotary member that is joined to the rotary shaft, the rotary member is rotatively driven by electromagnetic drive force;
   an expanded diameter section that is provided on the dynamic pressure bearing member and is extended in a radial direction;
   a fallout preventing member that is provided on the rotary member and overlaps the expanded diameter section of the dynamic pressure bearing member in an axial direction to prevent the rotary shaft from falling out of the dynamic pressure bearing member;
   a concave section that is formed in a part of the rotary member and opposes one end surface of the expanded diameter section of the dynamic pressure bearing member in the axial direction; and
   an annular projection portion formed in a radially inner part of the concave section, projecting toward the other side in the axial direction and surrounding a rotary axis to form a bore where one end of the rotary shaft is fixed by joining an inner peripheral surface of the bore to an outer peripheral surface of the rotary shaft to form a joint section.

2. A motor with fluid dynamic pressure bearing according to claim 1, further comprising lubricating oil present between the rotary shaft and the dynamic pressure bearing member, and a dynamic pressure force generating structure that is formed between the rotary shaft and the dynamic pressure bearing member and causes the lubricating oil between the rotary shaft and the dynamic pressure bearing member to generate dynamic pressure force through rotation of the rotary shaft relative to the dynamic pressure bearing member, thereby supporting the rotary shaft in a freely rotatable manner.

3. A motor with fluid dynamic pressure bearing according to claim 2, further comprising a sealing section that is located radially outside the dynamic pressure force generating structure and extends in an axial direction from an outer side of opposing surfaces in the axial direction of the fallout preventing member and the expanded diameter section to prevent the lubricating oil from flowing out from the dynamic pressure force generating structure.

4. A motor with fluid dynamic pressure bearing according to claim 1, further comprising a sealing section that extends in the axial direction from the outer side of opposing surfaces in the axial direction of the fallout preventing member and the expanded diameter section.

5. A motor with fluid dynamic pressure bearing according to claim 1, further comprising a radial dynamic pressure bearing formed in a radial direction at opposing surfaces between the rotary shaft and the dynamic pressure bearing member, and a thrust dynamic pressure bearing formed in the axial direction at opposing surfaces between the expanded diameter section of the dynamic pressure bearing member and the rotary member.

6. A motor with fluid dynamic pressure bearing according to claim 5, wherein the thrust dynamic pressure bearing is formed in the concave section of the rotary member.

7. A motor with fluid dynamic pressure bearing according to claim 5, wherein the thrust dynamic pressure bearing is formed in the axial direction at opposing surfaces between the concave section of the rotary member and the expanded diameter section of the dynamic pressure bearing member.

8. A motor with fluid dynamic pressure bearing according to claim 5, further comprising: lubricating oil filled in the radial dynamic pressure bearing and the thrust dynamic pressure bearing; and a tapered section provided in the radial direction between an outer circumference surface of the dynamic pressure bearing member and an opposing inner circumference surface of the fallout preventing member, removed in the axial direction from the thrust dynamic pressure bearing, wherein the tapered section has a gap dimension that becomes gradually larger away from the thrust dynamic pressure bearing in the axial direction, and the tapered section defines a capillary sealing section that prevents the lubricating oil from leaking.

9. A motor with fluid dynamic pressure bearing according to claim 1, wherein the rotary member includes a disk mounting hub that composes a part of a disk drive apparatus.

10. A motor with fluid dynamic pressure bearing according to claim 1, further comprising a drive magnet provided on an outer circumference side of the rotary member, and a stator provided on an outer circumference side of the drive magnet, thereby defining an inner rotor-type motor.

11. A motor with fluid dynamic pressure bearing according to claim 10, further comprising a base plate opposite the drive magnet, and a magnetic plate placed on a surface of the base plate, wherein the drive magnet and the magnetic plate generate magnetic attractive force in the direction opposite to dynamic pressure force in the thrust direction generated by the thrust dynamic pressure bearing.

12. A motor with fluid dynamic pressure bearing according to claim 1, wherein the dynamic pressure bearing member has an end surface defining a rotary shaft insertion hole and a circumferential groove that is concave in an axial direction and continuous in a circumferential direction around the rotary shaft insertion hole, and a cover closes off the end surface of the dynamic pressure bearing member, wherein an outer circumference edge of the cover is folded in the axial direction to form a folded edge section that extends into the circumferential groove of the dynamic pressure bearing member, and an adhesive filled in the circumferential groove, wherein the folded edge section of the cover is adhered to the dynamic pressure bearing member by the adhesive inside the circumferential groove.

13. An oil dynamic pressure bearing apparatus comprising:
- a dynamic pressure bearing member having an end surface defining a rotary shaft insertion hole and a circumferential groove that is concave in an axial direction and continuous in a circumferential direction around the rotary shaft insertion hole;
- a rotary shaft that rotates relatively to the dynamic pressure bearing member;
- a cover that closes off the end surface of the dynamic pressure bearing member, wherein an outer circumference edge of the cover is folded in the axial direction to form a folded edge section that extends into the circumferential groove of the dynamic pressure bearing member; and
- an adhesive filled in the circumferential groove, wherein the folded edge section of the cover is adhered to the dynamic pressure bearing member by the adhesive inside the circumferential groove.

14. An oil dynamic pressure bearing apparatus according to claim 13, further comprising:
- lubricating oil in a miniscule gap between the rotary shaft and the dynamic pressure bearing member; and
- a radial dynamic pressure bearing structure formed in a radial direction between opposing surfaces of the rotary shaft and the dynamic pressure bearing member.

15. An oil dynamic pressure bearing apparatus according to claim 13, wherein an inner circumference surface of the folded edge section of the cover is in contact with an inner circumference surface of the circumferential groove of the dynamic pressure bearing member.

16. An oil dynamic pressure bearing apparatus according to claim 13, wherein a gap between the folded edge section of the cover and an inner circumference surface of the circumferential groove of the dynamic pressure bearing member is smaller than a gap between the folded edge section of the cover and an outer circumference surface of the circumferential groove.

17. An oil dynamic pressure bearing apparatus according to claim 13, wherein the end surface of the dynamic pressure bearing member includes an inner side end surface radially inside the circumferential groove and an outer side and surface radially outside the circumferential groove, wherein the cover covers the inner side and surface of the end surface of the dynamic pressure bearing member.

18. An oil dynamic pressure bearing apparatus according to claim 17, wherein an inner circumference surface of the folded edge section of the cover is in contact with an inner circumference surface of the circumferential groove of the dynamic pressure bearing member.

19. An oil dynamic pressure bearing apparatus according to claim 17, wherein a gap between the folded edge section of the cover and an inner circumference surface of the circumferential groove of the dynamic pressure bearing member is smaller than a gap between the folded edge section of the cover and an outer circumference surface of the circumferential groove.

20. A bearing structure for an oil dynamic pressure bearing motor, comprising:
- a dynamic pressure bearing member including a main body section and an expanded diameter section radially extending outwardly from the main body section; and
- a rotary member having a rotary shaft, a fallout preventing member that overlaps the expanded diameter section of the dynamic pressure bearing member in an axial direction to prevent the rotary member from falling out of the dynamic pressure bearing member, a concave section that opposes one end surface of the expanded diameter section of the dynamic pressure bearing member in the axial direction, and an annular projection portion formed in a radially inner part of the concave section, projecting toward the other side in the axial direction and surrounding an rotary axis to form a bore where one end of the rotary shaft is fixed by joining an inner peripheral surface of the bore to an outer peripheral surface of the rotary shaft to form a joint section.

21. A bearing structure according to claim 20, wherein the dynamic pressure bearing member includes an end surface on one end of the main body section opposite to the expanded diameter section, the end surface defining a rotary shaft insertion hole, and a circumferential groove that is concave in the axial direction and continuous in a circumferential direction around the rotary shaft insertion hole.

22. A bearing structure according to claim 20, further comprising:
- a cover that closes off the end surface of the dynamic pressure bearing member, wherein an outer circumference edge of the cover is folded in the axial direction to form a folded edge section that extends into the circumferential groove of the dynamic pressure bearing member; and
- an adhesive filled in the circumferential groove, wherein the folded edge section of the cover is adhered to the dynamic pressure bearing member by the adhesive inside the circumferential groove.

23. A bearing structure according to claim 22, wherein an inner circumference surface of the folded edge section of the cover is in contact with an inner circumference surface of the circumferential groove of the dynamic pressure bearing member.

24. A bearing structure according to claim 22, wherein a gap between the folded edge section of the cover and an inner circumference surface of the circumferential groove of the dynamic pressure bearing member is smaller than a gap between the folded edge section of the cover and an outer circumference surface of the circumferential groove.

25. A bearing structure according to claim 22, wherein the end surface of the dynamic pressure bearing member includes an inner side end surface radially inside the circumferential groove and an outer side end surface radially outside the circumferential groove, wherein the cover covers the inner side end surface of the end surface of the dynamic pressure bearing member.

* * * * *